United States Patent
Liu et al.

(10) Patent No.: US 11,210,357 B2
(45) Date of Patent: Dec. 28, 2021

(54) AUTOMATICALLY CATEGORIZING BOOKMARKS FROM CUSTOMIZED FOLDERS AND IMPLEMENTATION BASED ON WEB BROWSING ACTIVITY

(71) Applicant: International Business Machines Corporation, Armonk, NY (US)

(72) Inventors: Su Liu, Austin, TX (US); Kai Liu, Beijing (CN); Manjunath Ravi, Austin, TX (US); Zhichao Li, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 756 days.

(21) Appl. No.: 16/133,473

(22) Filed: Sep. 17, 2018

(65) Prior Publication Data
US 2020/0089815 A1    Mar. 19, 2020

(51) Int. Cl.
  *G06F 16/20* (2019.01)
  *G06F 16/90* (2019.01)
  *G06F 16/955* (2019.01)
  *G06F 16/28* (2019.01)
  *G06F 16/22* (2019.01)

(52) U.S. Cl.
  CPC ...... *G06F 16/9562* (2019.01); *G06F 16/2246* (2019.01); *G06F 16/2255* (2019.01); *G06F 16/285* (2019.01)

(58) Field of Classification Search
  None
  See application file for complete search history.

(56) References Cited

U.S. PATENT DOCUMENTS

| 6,041,360 A | 3/2000 | Himmel et al. |
| 8,126,879 B2* | 2/2012 | Gemmell ............ G06F 16/9562 |
| | | 707/723 |
| 8,533,199 B2 | 9/2013 | Malla |

(Continued)

FOREIGN PATENT DOCUMENTS

| WO | 2005008527 A1 | 1/2005 |
| WO | 2017003893 A1 | 1/2017 |

OTHER PUBLICATIONS

Schmidt et al., "Socially Filtered Web Search," SAC '09, 2009 [retrieved on Aug. 27, 2021]. Retrieved from the Internet:< URL: https://dl.acm.org/doi/pdf/10.1145/1529282.1529420 >. (Year: 2009).*

(Continued)

*Primary Examiner* — Kristopher Andersen
(74) *Attorney, Agent, or Firm* — Zilka-Kotab, P.C.

(57) ABSTRACT

A computer-implemented method, according to one embodiment, includes: collecting information which corresponds to internet browsing activity, receiving a request to create a bookmark for a first website, and creating keyword and density pairs (KDPs) for the first website using the information collected prior to receiving the request to create the bookmark. Creating the KDPs includes: extracting a plurality of keywords from the first website, and calculating a density value for each of the plurality of keywords based on the information collected prior to receiving the request to create the bookmark. Furthermore, each keyword and respective density value are added to a hash map as a KDP entry. Other systems, methods, and computer program products are described in additional embodiments.

20 Claims, 16 Drawing Sheets

(56) References Cited

U.S. PATENT DOCUMENTS

| | | | |
|---|---|---|---|
| 9,106,698 | B2 | 8/2015 | Guan et al. |
| 9,646,102 | B2 | 5/2017 | Davis et al. |
| 2003/0144984 | A1 | 7/2003 | Dunbar |
| 2008/0046441 | A1* | 2/2008 | Wen .................. G06F 40/143 |
| 2013/0311869 | A1 | 11/2013 | Jang |
| 2017/0004220 | A1 | 1/2017 | Quintero |

OTHER PUBLICATIONS

Bauer, R., "Media (R)evolutions: Time spent online continues to rise," The World Bank, Feb. 10, 2016, 7 pages, retrieved from http://blogs.worldbank.org/publicsphere/media-revolutions-time-spent-online-continues-rise.

Karaian, J., "We now spend more than eight hours a day consuming media," Quartz, Jun. 1, 2015, 7 pages, retrieved from https://qz.com/416416/we-now-spend-more-than-eight-hours-a-day-consuming-media/.

IBM, "Empowering Heroes, Transforming Health," IBM Watson Health, 2018, 8 pages, retrieved from https://www.ibm.com/watson/health/.

IBM, "Watson Health Life Sciences," IBM Watson Health, 2018, 10 pages, retrieved from https://www.ibm.com/watson/health/life-sciences/.

Anonymous, "NIST Cloud Computing Program," NIST, Information Technology Laboratory, Nov. 13, 2013, pp. 1-2, retrieved from www.nist.gov/itl/cloud/.

Mell et al., "The NIST Definition of Cloud Computing," Version 15, Dec. 7, 2009, pp. 1-2.

Mell et al., "The NIST Definition of Cloud Computing," Recommendations of the National Institute of Standards and Technology, NIST Special Publication 800-145, Sep. 2011, pp. 1-7.

CSRC, "Cloud Computing," Computer Security Resource Center, Oct. 2017, 3 pages, retrieved from https://csrc.nist.gov/projects/cloud-computing.

\* cited by examiner

```
HashMap<keyword, density> bookmark_keywords;
current_level = top level of the tree
while(true) {
    for(node in current_level) {
        //compute total weights for each node in current level
        total_weights(bookmark_keywords, node);
    }
    compare total_weights of each node;
    current_level = lower level of node with max(total_weight);
    if(lower level of node has no nodes) return node;  //END
} total_weights(bookmark_keywords, node) {
    LinkedList<entry<word, weight>> list = node.getList();   //get featured words list in node
    for(each word in the list) {
        compute Total weights = ((density)*(weight)(matched_word)] + ... + density)*(weight)(matched_word)]) * 100
                                                                                         /(N)
    }
}
```

AUTOMATICALLY CATEGORIZING BOOKMARKS FROM CUSTOMIZED FOLDERS AND IMPLEMENTATION BASED ON WEB BROWSING ACTIVITY

BACKGROUND

The present invention relates to automatic categorization of information, and more specifically, this invention relates to automatically categorizing bookmarks based on web browsing activity.

As internet use continues to increase, the number and type of search engines available to satisfy internet-based searches increase as well. Despite the many differences which exist between these diverse search engines, a common thread extending between many is the bookmark feature. A bookmark which is saved provides a link to a specific website address. In an effort to provide some organization, search engines typically offer an architecture which allows for bookmarks to be categorized in folders and/or subfolders.

However, the sheer number of bookmarks which are supported by many search engines, and the fact that bookmarks tend to dynamically change over time, causes difficulties in managing existing bookmarks. For instance, systems which organize bookmarks with folders and subfolders configured in a tree structure make it difficult to determine which folder to add a given bookmark to, as bookmarks share common features under the same root or child folders.

Conventional products attempt to address some of these issues by grouping bookmarks by their Uniform Resource Locator (URL) domain. However, these conventional products do not support customizable features, and are also restricted by URL content, thereby limiting the available keywords to those which can be extracted from the respective website.

SUMMARY

A computer-implemented method, according to one embodiment, includes: collecting information which corresponds to internet browsing activity, receiving a request to create a bookmark for a first website, and creating keyword and density pairs (KDPs) for the first website using the information collected prior to receiving the request to create the bookmark. Creating the KDPs includes: extracting a plurality of keywords from the first website, and calculating a density value for each of the plurality of keywords based on the information collected prior to receiving the request to create the bookmark. Furthermore, each keyword and respective density value are added to a hash map as a KDP entry.

A computer-implemented method, according to another embodiment, includes: collecting information which corresponds to internet browsing activity, detecting that a bookmark was created for a first website, and creating keyword and density pairs (KDPs) for the first website using the information collected prior to detecting that the bookmark was created. Creating the KDPs includes: extracting a plurality of keywords from the first website, and calculating a density value for each of the plurality of keywords based on the information collected prior to detecting that the bookmark was created. Moreover, a total density for each of a plurality of nodes included in a tree structure is calculated, and a recommendation is made that the bookmark be added to a node having a greatest total density. Calculating the total density for a given node is based on a number of keywords which overlap between the given node and the KDPs for the first website.

A computer program product, according to yet another embodiment, includes a computer readable storage medium having program instructions embodied therewith. The computer readable storage medium is not a transitory signal per se. Moreover, the program instructions are readable and/or executable by a processor to cause the processor to perform a method which includes: collecting, by the processor, information which corresponds to internet browsing activity; detecting, by the processor, that a bookmark was created for a first website; and creating, by the processor, keyword and density pairs (KDPs) for the first website using the information collected prior to detecting that the bookmark was created. Creating the KDPs includes: extracting a plurality of keywords from the first website, and calculating a density value for each of the plurality of keywords based on the information collected prior to detecting that the bookmark was created. Furthermore, a total density for each of a plurality of nodes included in a tree structure is calculated by the processor. A recommendation is also made, by the processor, that the bookmark be added to a node having a greatest total density. Calculating the total density for a given node is based on a number of keywords which overlap between the given node and the KDPs for the first website.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7B is a partial view of pseudocode in accordance with an exemplary embodiment.

DETAILED DESCRIPTION

Figure 1:
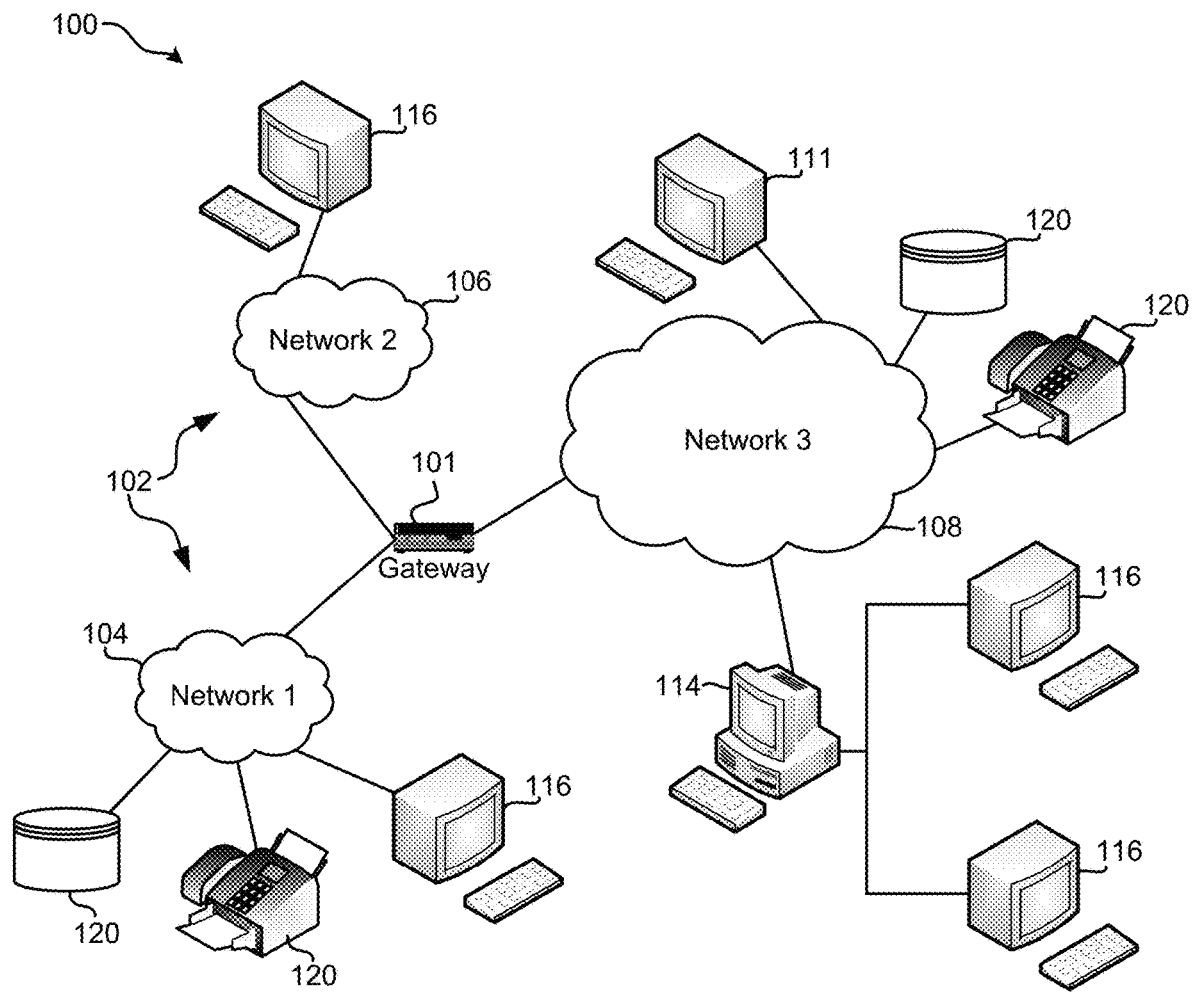
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for automatically categorizing bookmarks from customized folders and implementing recommendations based on user browsing behavior, e.g., as will be described in further detail below.

In one general embodiment, a computer-implemented method includes: collecting information which corresponds to internet browsing activity, receiving a request to create a bookmark for a first website, and creating keyword and density pairs (KDPs) for the first website using the information collected prior to receiving the request to create the bookmark. Creating the KDPs includes: extracting a plurality of keywords from the first website, and calculating a density value for each of the plurality of keywords based on the information collected prior to receiving the request to create the bookmark. Furthermore, each keyword and respective density value are added to a hash map as a KDP entry.

In another general embodiment, a computer-implemented method includes: collecting information which corresponds to internet browsing activity, detecting that a bookmark was created for a first website, and creating keyword and density pairs (KDPs) for the first website using the information collected prior to detecting that the bookmark was created. Creating the KDPs includes: extracting a plurality of keywords from the first website, and calculating a density value for each of the plurality of keywords based on the information collected prior to detecting that the bookmark was created. Moreover, a total density for each of a plurality of nodes included in a tree structure is calculated, and a recommendation is made that the bookmark be added to a node having a greatest total density. Calculating the total density for a given node is based on a number of keywords which overlap between the given node and the KDPs for the first website.

In yet another general embodiment, a computer program product includes a computer readable storage medium having program instructions embodied therewith. The computer readable storage medium is not a transitory signal per se. Moreover, the program instructions are readable and/or executable by a processor to cause the processor to perform a method which includes: collecting, by the processor, information which corresponds to internet browsing activity; detecting, by the processor, that a bookmark was created for a first website; and creating, by the processor, keyword and density pairs (KDPs) for the first website using the information collected prior to detecting that the bookmark was created. Creating the KDPs includes: extracting a plurality of keywords from the first website, and calculating a density value for each of the plurality of keywords based on the information collected prior to detecting that the bookmark was created. Furthermore, a total density for each of a plurality of nodes included in a tree structure is calculated by the processor. A recommendation is also made, by the processor, that the bookmark be added to a node having a greatest total density. Calculating the total density for a given node is based on a number of keywords which overlap between the given node and the KDPs for the first website.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
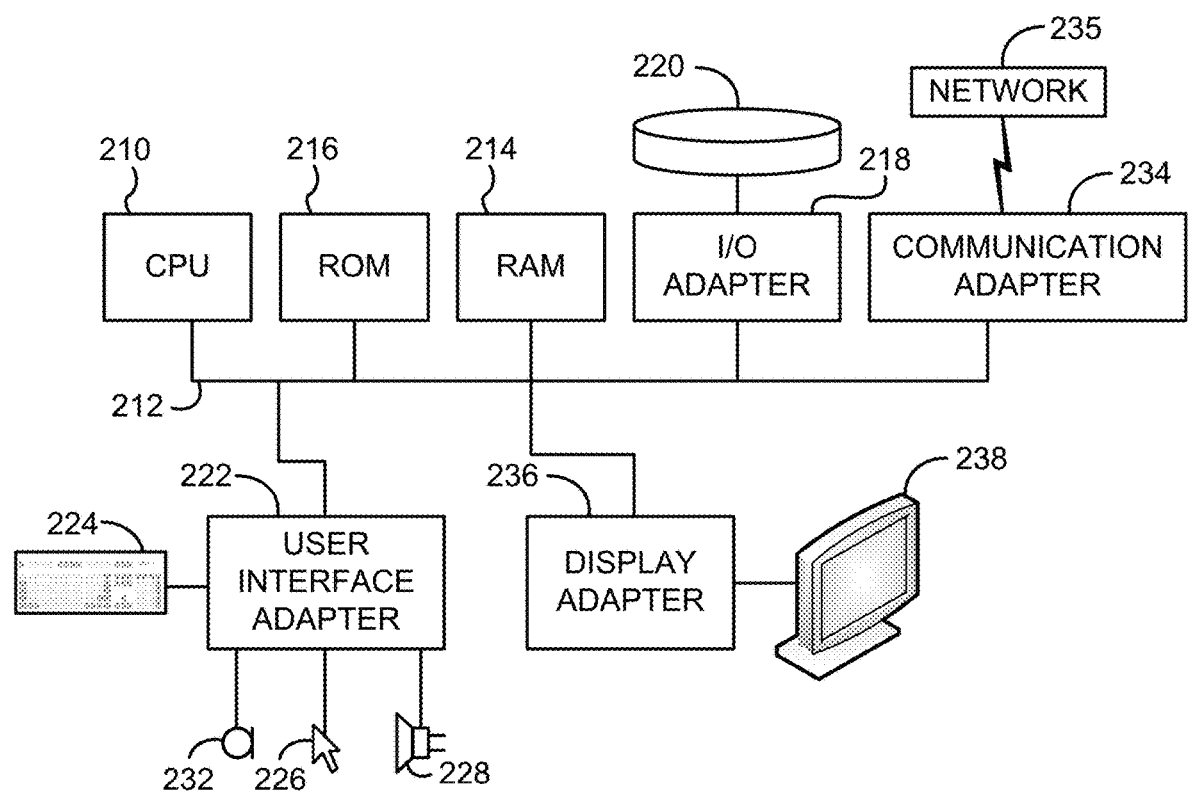
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
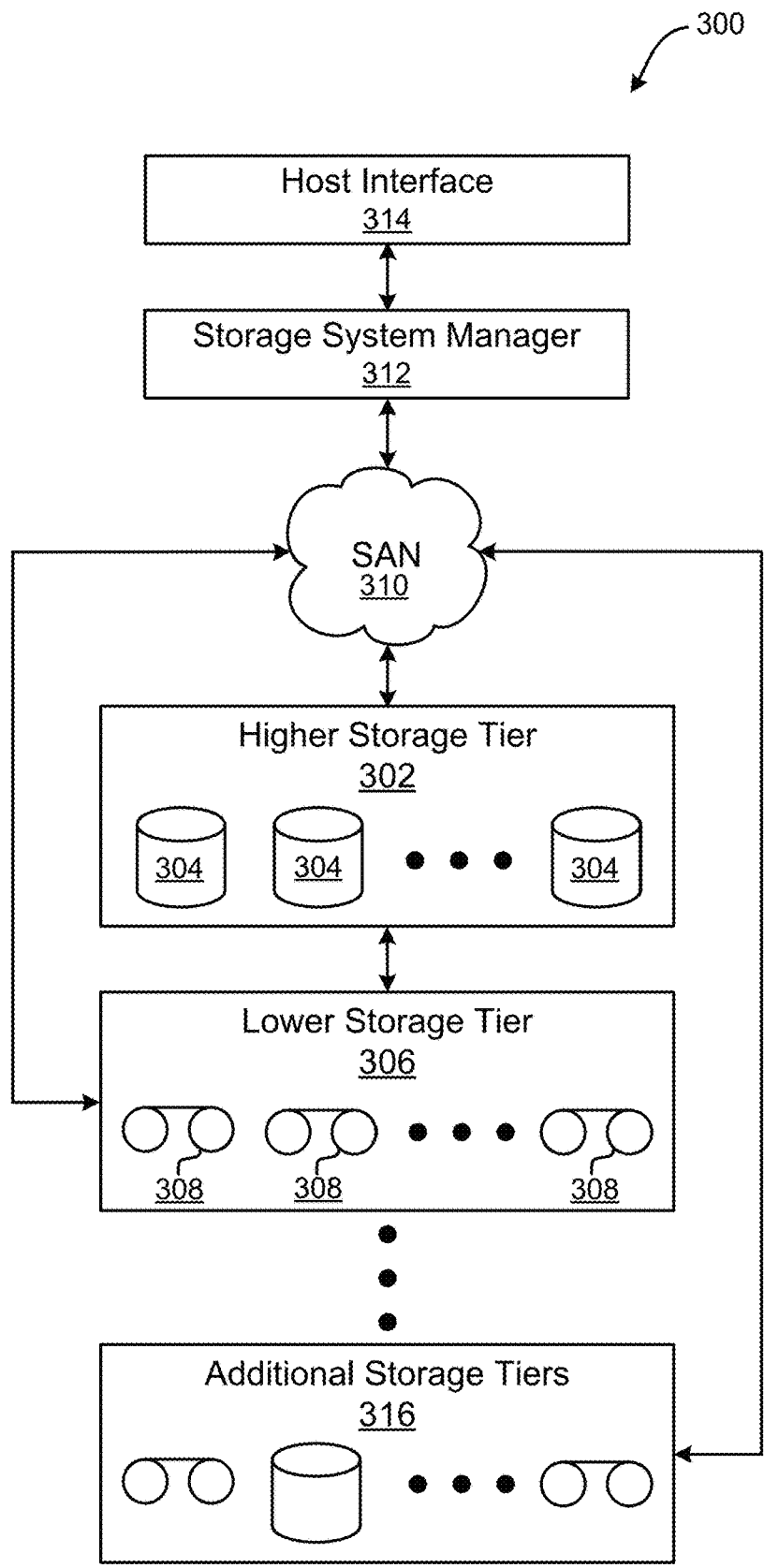
FIG. 3 is a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As previously mentioned, bookmarks provide links to specific website addresses and serve as a useful tool related to web browsing activity. In an effort to provide some organization, search engines typically offer an architecture which allows for saved bookmarks to be categorized in folders and/or subfolders. However, the sheer number of bookmarks which are supported by many search engines, and the fact that bookmarks tend to dynamically change over time, causes difficulties in managing existing bookmarks. For instance, systems which organize bookmarks with folders and subfolders configured in a tree structure make it difficult to determine which folder to add a given bookmark to, as bookmarks share common features under the same root or child folders.

Conventional products attempt to address some of these issues by grouping bookmarks by their URL domain. However, these conventional products do not support customizable features, and are also restricted by URL content, thereby limiting the available keywords to those which can be extracted from the respective website.

In sharp contrast, various ones of the embodiments included herein are able to accurately and automatically categorize bookmarks without relying on the receipt of any prompted (e.g., requested) information from a user. Rather, by tracking browsing activity and evaluating the browsing activity which occurred leading up to the creation of a new bookmark, some of the embodiments herein are able to implement real time analysis when adding the new bookmark to a structured list, e.g., as will be described in further detail below.

Figure 4A:
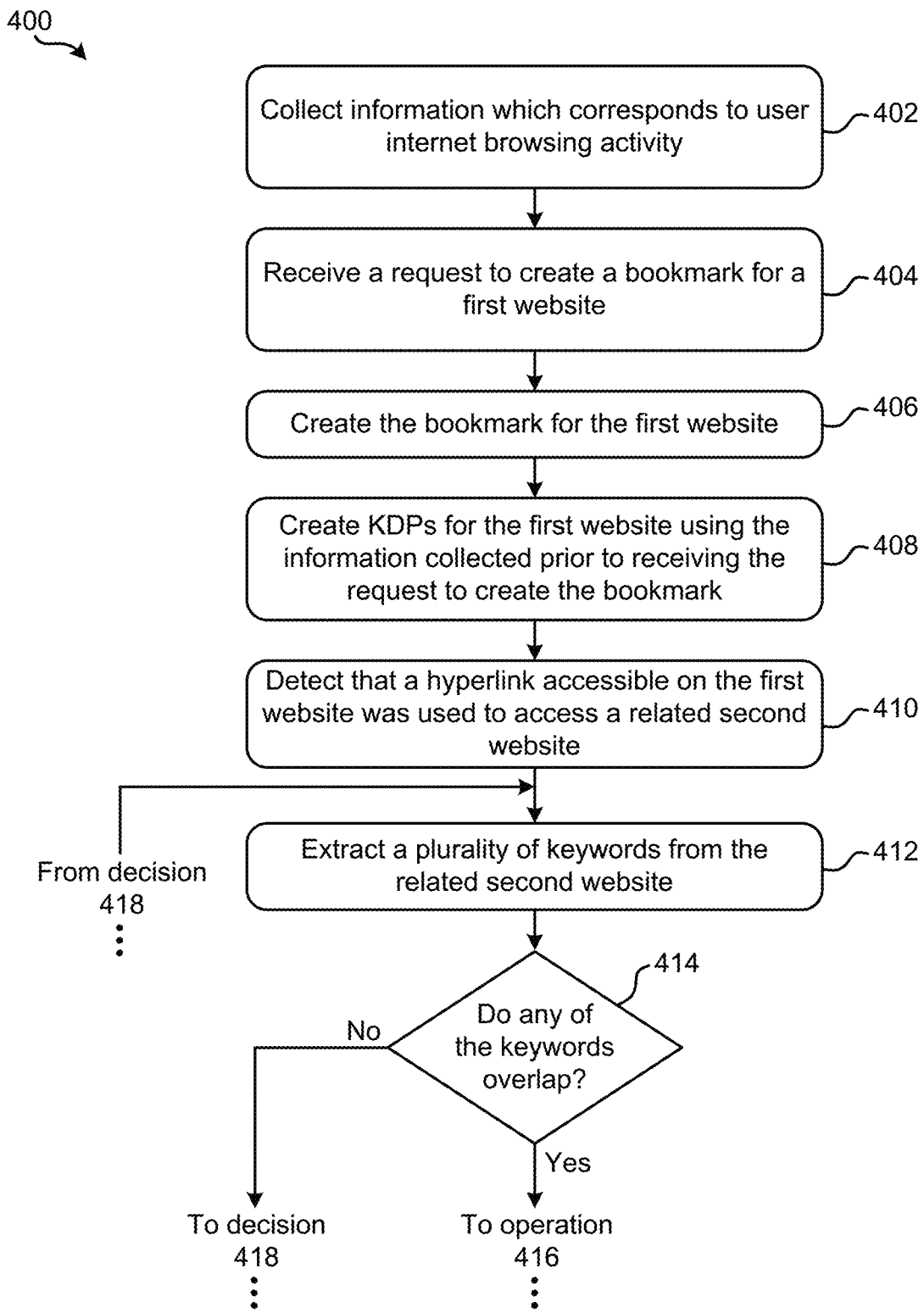
FIG. 4A is a flowchart of a method in accordance with one embodiment.
Figure 4A:
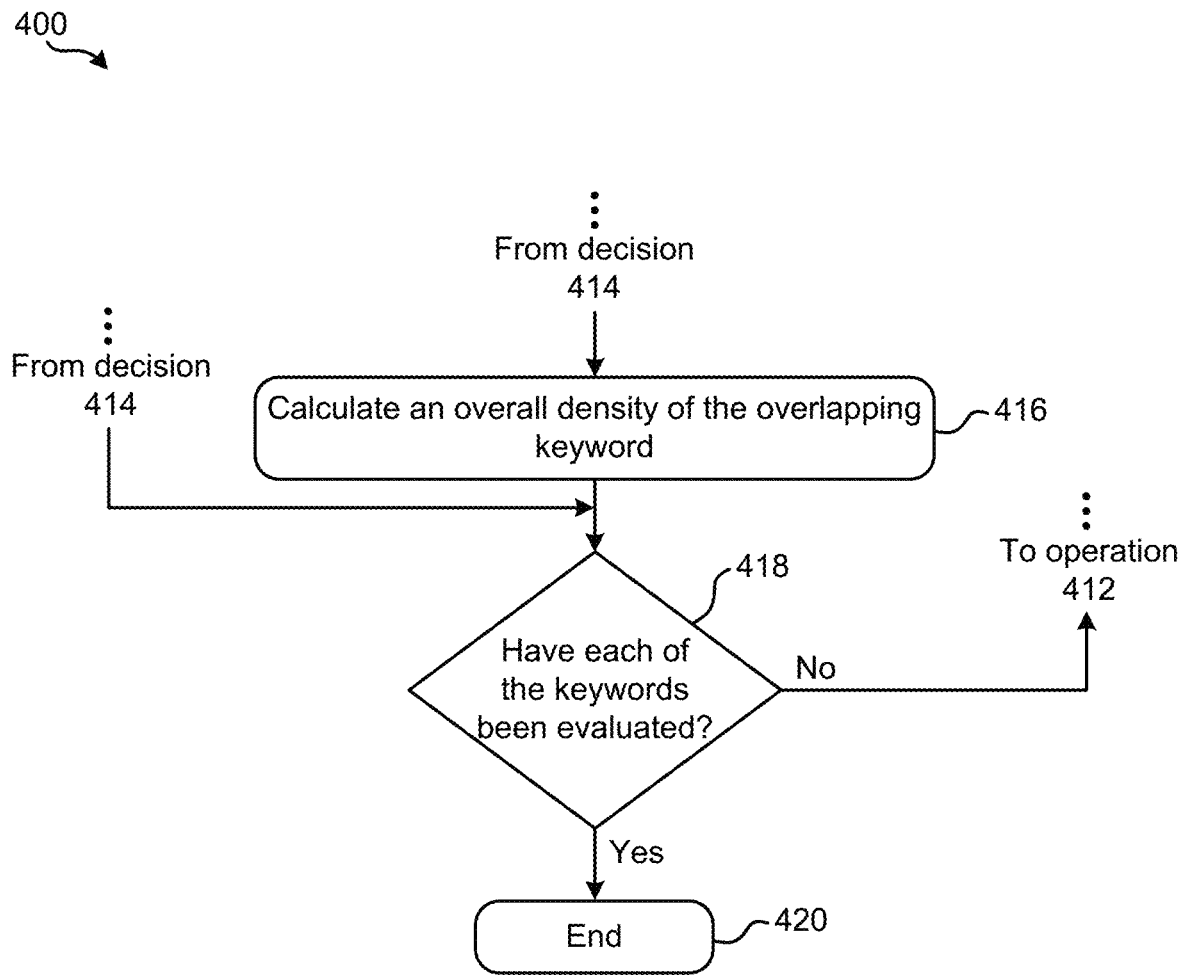

Referring to FIG. 4A, a flowchart of a method 400 for extracting keywords and corresponding density information from a bookmarked webpage based on browsing activity is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, a processor, a computer, etc., or some other device having one or more processors therein. Thus, in some embodiments, method 400 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module (s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 of method 400 includes collecting information which corresponds to user internet browsing activity. The type of information collected in operation 402 varies depending on the given approach. For instance, an illustrative list of types of information which may be collected in operation 402 includes, but is not limited to, URL content (e.g., internet addresses of websites visited), an amount of time spent accessing a given website, types of activity registered while accessing a given website (e.g., scrolling), hyperlink utilization, etc. It should also be noted that although operation 402 appears to be a single operation in FIG. 4A, it is preferred that the information is collected in a constant manner. In other words, information corresponding to user internet browsing activity is preferably collected continuously as long as the internet browsing activity persists.

This information may also be collected in a number of different ways. For instance, in some approaches, information which corresponds to user internet browsing activity is collected by accessing (e.g., querying) a server being used to facilitate the user's internet browsing activity. In other words, a server which maintains a user's connection to the internet and/or serves as an intermediary router between the two can send information (which corresponds to a user's internet browsing activity) to the controller performing various ones of the processes in method 400. In other approaches, the electronic device utilized by the user to facilitate internet access may store information which corresponds to the user's internet browsing activity. For example, a personal computer utilized by the user to access a number of websites is able to store the internet addresses of the websites visited, an amount of time spent visiting each website, the actual path taken between each of the websites, etc. Thus, operation 402 is performed in some approaches by sending a request to the electronic device used to facilitate the internet browsing activity.

The information collected in operation 402 is preferably stored in memory. In some approaches, this information is maintained in memory unless one or more instructions to delete at least a portion of the stored information are received. In other approaches, this information is stored for a predetermined amount of time before being deleted and/or overwritten with more recent information, e.g., according to a schedule. According to an example, which is in no way intended to limit the invention, information corresponding to user internet browsing activity is maintained in memory for at least 15 minutes (but could be higher or lower depending on the desired approach) before being released to be overwritten. In still other approaches, this information is stored in a circular buffer such that once a maximum amount of data has been stored, an oldest portion of the information is overwritten by newly received information. It follows that the information which corresponds to internet browsing activity can be stored in any desired manner.

Method 400 further includes receiving a request to create a bookmark for a first website. See operation 404. As mentioned above, the information corresponding to user internet browsing activity is preferably collected continuously as long as the internet browsing activity persists. Accordingly, the bookmark creation request is received at some point during the collecting. Information corresponding to user internet browsing activity may even continue to be collected throughout performance of the various processes included in method 400. Thus, operation 402 may continue to run in a recursive fashion in some approaches, e.g., as would be appreciated by one skilled in the art after reading the present description.

Although the request received in operation 404 may have been initiated by a user, the request is actually received from an electronic device utilized by the user to facilitate access to the first website in some approaches. However, in other approaches the request to create a bookmark for a first website may be received directly from the user, a local server, etc.

In response to receiving the request to create a bookmark, operation 406 includes actually creating the bookmark for the first website. Creating the bookmark may be performed using any processes which would be apparent to one skilled in the art after reading the present description. For instance, in some approaches the bookmark may be created by using the internet address of the first website to create a hyperlink. However, establishing a name, storage location, display location on a program and/or operating system, etc. of the hyperlink may be at least temporarily postponed until keyword and density pairs (KDPs) are determined and/or used to update a respective hash map, e.g., as will be described in further detail below.

Looking to operation 408, KDPs are created for the first website using the information collected prior to receiving the request to create the bookmark. In other words, the information collected in operation 402 prior to receiving the request to create a bookmark for the first website in operation 404 is used to create KDPs for the first website. The majority of users access search engines in order to obtain quality information from the internet. Lack of training and/or lack of organized information are some of the factors that affect the efficiency by which a user is able to access relevant websites through the internet. Thus, while a user's browsing history is relevant in terms of indicating the type of information that is being searched for, it often takes time before a user is able to locate the type, quantity, quality, etc. of information they were searching for in the first place. The information collected prior to receiving a bookmark creation request thereby provides valuable insight into the type of information the user is interested in and provides context which may be used to eventually organize the bookmark in a tree structure according to any of the approaches included herein.

Figure 4B:
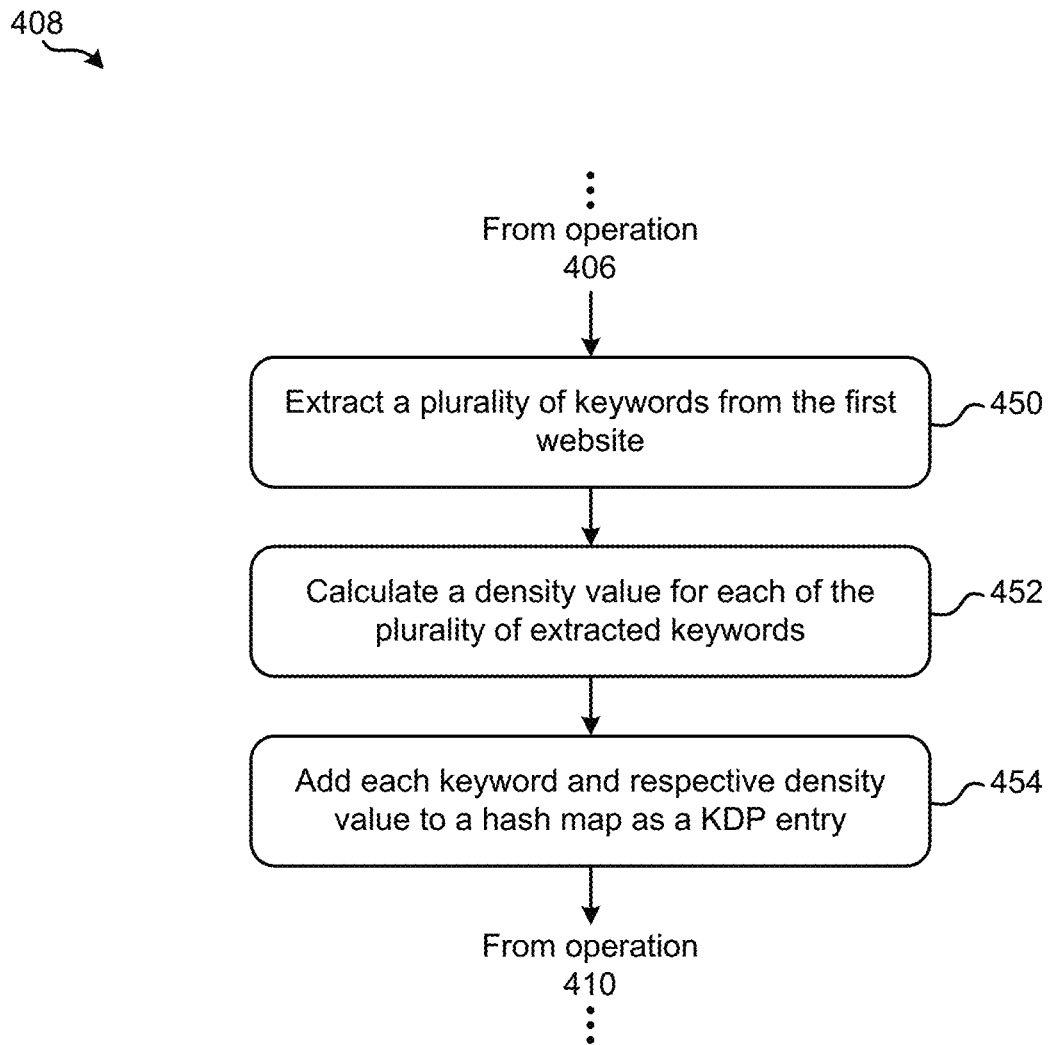
FIG. 4B is a flowchart of sub-processes for one of the operations in the method of FIG. 4A, in accordance with one embodiment.

Referring momentarily to FIG. 4B, exemplary sub-processes of creating KDPs for the first website are illustrated in accordance with one embodiment, one or more of which may be used to perform operation 408 of FIG. 4A. However, it should be noted that the sub-processes of FIG. 4B are illustrated in accordance with one embodiment which is in no way intended to limit the invention.

As shown, sub-operation 450 includes extracting a plurality of keywords from the first website. The keywords for a given website include words found on the website which are determined as having a certain level of importance with respect to a remainder of the words found on the website. According to the present description, the "importance" that a given word or short phrase has can be determined differently. In some approaches, words which appear a greater number of times on a given webpage are determined as having a greater importance than words which appear a fewer number of times, and may therefore be considered to be keywords. In other approaches, words found in specific regions of the website, e.g., such as a title, the URL, a footer, etc.; words which have different formatting, e.g., such as bold words, capitalized words, words that have been italicized, etc.; etc., may be designated as being keywords. It follows that the process of extracting keywords from a given website may involve searching, grouping, merging, evaluating, etc. the text found on the website itself.

Moreover, sub-operation 452 includes calculating a density value for each of the plurality of keywords extracted in sub-operation 450. Although a number of words from a given website are determined as being keywords in their own regard, it is unlikely that each of these keywords appear an equal number of times on the website, are located in a same region of the website, have the same formatting, etc. Accordingly, a density value is preferably calculated for each of the keywords extracted from the first website. In preferred approaches, the density value for a given keyword is calculated based on the information collected prior to receiving the request to create the bookmark.

Density values can be represented a number of different ways. For instance, in some approaches the density values are expressed as a percentage, e.g., such that the density value assigned to each keyword is based on a defined scale of 100%. According to an illustrative example, which is in no way intended to limit the invention, the density value of a given keyword is determined by comparing the total number of words found on the website to the total number of instances of the keyword found on the website. In other approaches, the density value for a given keyword can be represented as a "weight" which is determined based on additional factors, e.g., such as an amount of time a portion of the website which contains the keyword is displayed in a window visible to a user, a number of times the keyword is found on a subsequently and/or previously accessed website, search terms used to find the website, etc. However, the density values may be represented and/or determined in any other way which would be apparent to one skilled in the art after reading the present description.

According to an exemplary approach, which is in no way intended to limit the invention, the process of calculating a density value for each of the extracted keywords includes determining whether the given keyword is included in any other websites accessed by the user in a window of time which precedes a time that the request to create the bookmark was received in operation 404 above. In other words, the density value depends on whether the given keyword appears in any of the other websites accessed during the internet browsing activity prior to receiving a request to actually create the corresponding bookmark. However, it is impractical to consider all websites accessed prior to receiving the bookmark creation request. Rather, those websites accessed in a window of time leading up to the bookmark creation request is considered.

The length of the window varies depending on the desired approach. As mentioned above, information corresponding to user internet browsing activity is maintained in memory for at least 15 minutes in some approaches before being released to be overwritten. Accordingly, the websites accessed in a 15 minute window leading up to the bookmark creation request may be considered when calculating the density value for a given keyword in some approaches.

In response to determining that the given keyword is included in one or more of the other websites accessed in the window of time, the density value of the given keyword is preferably increased. The amount by which the density value is increased corresponds to a combined amount of time spent accessing the one or more other websites which include the given keyword in some approaches. The amount by which the density value is increased and/or the manner in which the density value is increased may also depend on the numbering scheme used to actually represent the density value. For example, a minimum unit of measurement for the scale used to represent the density value may define a minimum amount by which the density value can be increased. In another example, the density value may be increased by a predetermined amount set by a user, the server providing the internet access, a system administrator, etc.

According to an exemplary approach, which is in no way intended to limit the invention, Equation 1 is used to calculate the density of a keyword which appears on more than one website accessed in a given amount of time.

$$\text{density} = \frac{(\text{density1}[\text{from site1}] + \text{density2}[\text{from site2}] \ldots + \text{densityN}[\text{from siteN}]}{N} \quad \text{Equation 1}$$

Here, N represents the number of sites accessed in a given window of time. Accordingly, the density value for uncommon keywords will decrease as they appear less frequently, while the density value for common keywords will increase as they appear more frequently.

In another exemplary approach, which is again in no way intended to limit the invention, Equation 2 is used to calculate the density of a keyword based on the amount of time a user spends accessing the website on which the keyword is found.

$$\text{density} = DS1\frac{t_1}{T} + \frac{t_2}{T} \ldots + \frac{t_n}{T} \quad \text{Equation 2}$$

Here DS1 represents the density of the keyword from a first website accessed, DS2 represents the density of the keyword from a first website accessed, and so on. Furthermore, T represents the total amount of time during which the user browses websites, while to represents the amount of time that the user spends on a given website n within the total time T.

Figure 4C:
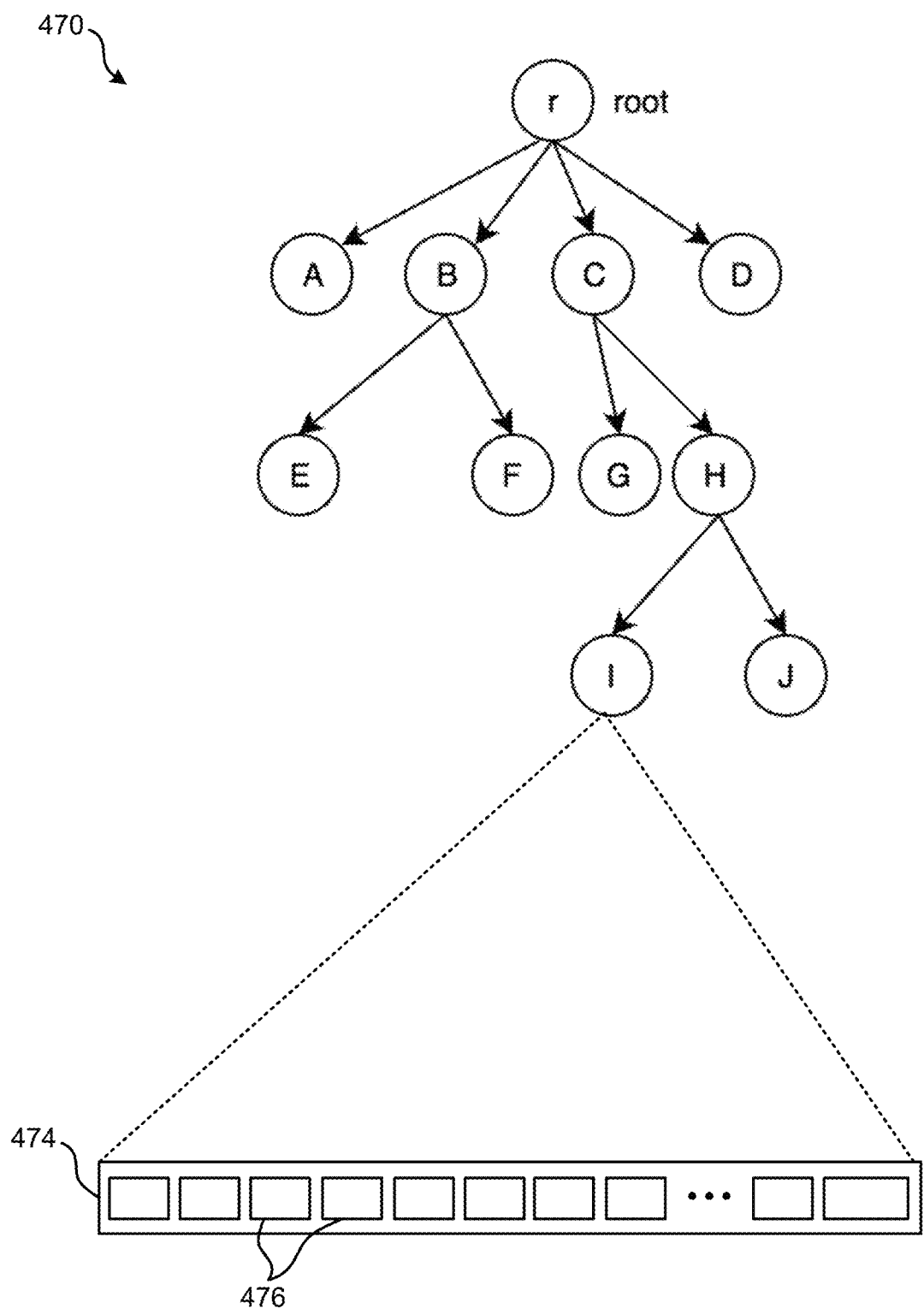
FIG. 4C is a partial representational view of a tree structure in accordance with one embodiment.

Keywords and their respective densities are preferably stored in the format of a hash map as a pair (e.g., see FIG. 4C below). Accordingly, with continued reference to FIG. 4B, the flowchart further proceeds to sub-operation 454 which includes adding each keyword and respective density value to a hash map (e.g., a "link list") as a KDP entry. Accordingly, a KDP entry includes a keyword as well as the density value which corresponds thereto, e.g., as an ordered pair. In some approaches the various KDP entries are organized based on the respective density values. For instance, the entries in the hash map may be organized such that the density values progress in a continuously increasing fashion or a continuously decreasing fashion.

Moreover, one of the entries in the hash map preferably serves as a placeholder which stores a total weight (also referred to herein as a "total density") of all keywords included in the hash map. For example, the last entry in the hash map is reserved for storing a total combined weight (or density) of all KDP entries therein. Accordingly, the last entry in the list serves as a placeholder in some approaches which stores the total combined weight resulting from performing the sub-operations in FIG. 4B. This total combined weight is further used in some approaches to compare against other nodes (e.g., folders). The hash map also corresponds to a node of a tree structure in some approaches, e.g., as will soon become apparent.

Returning now to FIG. 4A, operation 410 includes detecting that a hyperlink accessible on the first website was used to access a related second website. According to some approaches, this detection is made based on the internet browsing activity information being collected. Again, although operation 402 appears be a single operation in FIG. 4A, it is preferred that the information is collected in a constant manner. In other words, information corresponding to user internet browsing activity is preferably collected continuously as long as the internet browsing activity persists. In other approaches, a server, an application, an internet provider, etc. may actually inform the controller performing the various processes in method 400 that a hyperlink on the first website has been used to access a second website.

A plurality of keywords are also extracted from the related second website in operation 412. Any of the approaches described above with respect to sub-operation 450 of FIG. 4B may be implemented in order to perform operation 412. Moreover, decision 414 includes determining whether any of the keywords extracted from the related second website overlap (e.g., match) with any of the keywords extracted from the first website. In some approaches, each of the keywords extracted from the second website may be systematically compared to each of the keywords extracted from the first website. Accordingly, decision 414 af4nd/or other processes included in method 400 may actually be repeated in a recursive fashion for each of the keywords extracted from the second website.

In response to determining that a given keyword extracted from the second website does not overlap with a keyword extracted from the first website, method 400 jumps directly to decision 418, e.g., as will be described in further detail below. However, in response to determining that a given keyword extracted from the second website does overlap with a keyword extracted from the first website, method 400 proceeds to operation 416. There, operation 416 includes calculating an overall density of the overlapping keyword. The overall density of the overlapping keyword is calculated in a same way that the density of the keyword was previously calculated in sub-operation 452 of FIG. 4B in some approaches. However, in some approaches the overall density value can be represented as a "weight", e.g., as previously mentioned. In such approaches, the weight of a given keyword may be determined based on additional factors which include, but are not limited to, an amount of time a portion of the website which contains the keyword is displayed in a window visible to a user, a number of times the keyword is found on a subsequently and/or previously accessed website, search terms used to find the website, etc.

From operation 416, method 400 proceeds to decision 418 which includes determining whether each of the keywords extracted from the second website have been evaluated. In other words, decision 418 includes determining whether all of the keywords extracted from the second website have been compared with the keywords extracted from the first website to identify overlaps (e.g., matches) therebetween. In response to determining that each of the keywords extracted from the second website have not yet been evaluated, method returns to operation 412 such that at least one additional keyword extracted from the second website is compared with the keywords extracted from the first website. However, in response to determining that all of the keywords extracted from the second website have been compared with the keywords extracted from the first website, method 400 proceeds from decision 418 to operation 420. Upon reaching operation 420, method 400 may end. However, it should be noted that although method 400 may end upon reaching operation 420, any one or more of the processes included in method 400 may be repeated in order to create additional bookmarks for additional websites. In other words, any one or more of the processes included in method 400 may be repeated depending on the desired approach.

As mentioned above, the hash map used to store the various KDP entries created for a given website corresponds to a node of a tree structure in some approaches. For instance, referring momentarily to FIG. 4C, a tree structure 470 having a plurality of nodes labeled A through J is illustrated in accordance with an exemplary embodiment which is in no way intended to limit the invention. The various nodes of the tree structure 470 extend from a root root in such a way that certain nodes are subsets or "subnodes" of other ones of the nodes in a tree-like fashion as would be appreciated by one skilled in the art after reading the present description. For example, nodes E and F are subsets of node B, while nodes I and J are subsets of node H which is in turn a subset of node C.

Each of the nodes labeled A through J in turn have a respective hash map which corresponds thereto. For instance, node I is shown as corresponding to a hash map 474 which includes a plurality of KDP entries 476 according to any of the approaches described above. A hash map has a limit on the number of KDP entries which it is able to store at the same time. For instance, in some approaches a hash map is only able to store a maximum of 200 KDP entries therein, as well as the last entry which is used to store a total density value of all KDP entries stored in the hash map of the given node, e.g., as described above. It follows that each of the nodes in the tree structure 470 have a plurality KDP entries which represent the various keywords extracted from a website which corresponds thereto, as well as the respective density value which corresponds thereto. In other words, the density value represents the featured percentage of the given folder that the corresponding keyword takes-up. The feature of each folder is also uniquely decided by words and their weights in the list in some approaches.

Furthermore, each entry in the hash map of a given node in the tree structure 470 is based, at least in part, on the hash maps of any nodes which are subsets of the given node. In other words, the hash map for a given node is generated in preferred approaches by combining the hash maps of nodes which are subsets of the given node. Each of the nodes in the tree structure 470 further represent a folder or sub-folder in preferred approaches. For instance, a node in the highest level of the tree structure 470 represents a folder, while each of the sub-nodes which extend therefrom represent sub-folders which are at least somewhat related to the folder from which they extend. For instance, at least some of the keywords in a sub-node are in a same or similar category as the keywords which appear in the node which the sub-node extends from, e.g., as would be appreciated by one skilled in the art after reading the present description.

As mentioned above, method 400 relates to extracting keywords and corresponding density information from a bookmarked webpage based on browsing activity. The processes included in method 400 also involve using the extracted keywords and density information to create (or at least fill) hash maps. However, method 400 does not explicitly involve the actual manner in which a bookmark is stored. However, the keywords and/or density information extracted from a bookmarked webpage is further used in some approaches to identify a target folder and/or sub-folder for a newly created bookmark. For instance, looking to FIG. 5A, a method 500 for actually identifying a target folder and/or sub-folder for a newly created bookmark is illustrated in accordance with one embodiment. The method 500 may be performed in accordance with the present invention in any of the environments depicted in FIGS. 1-4, among others, in various embodiments. It should be noted that some of the processes included in method 500 are similar to those presented above with respect to method 400 of FIG. 4A. Accordingly, various ones of the processes included in method 500 may implement any of the approaches described above. In addition, more or less operations than those specifically described in FIG. 5A may be included in method 500, as would be understood by one of skill in the art upon reading the present descriptions.

Each of the steps of the method 500 may be performed by any suitable component of the operating environment. For example, in some embodiments method 500 is performed by a controller that is included in a computer, which is in turn connected to the Internet by a wireless and/or wired connection. In various other embodiments, the method 500 may be partially or entirely performed by a controller, a processor, a computer, etc., or some other device having one or more processors therein. Thus, in some embodiments, method 500 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Figure 5A:
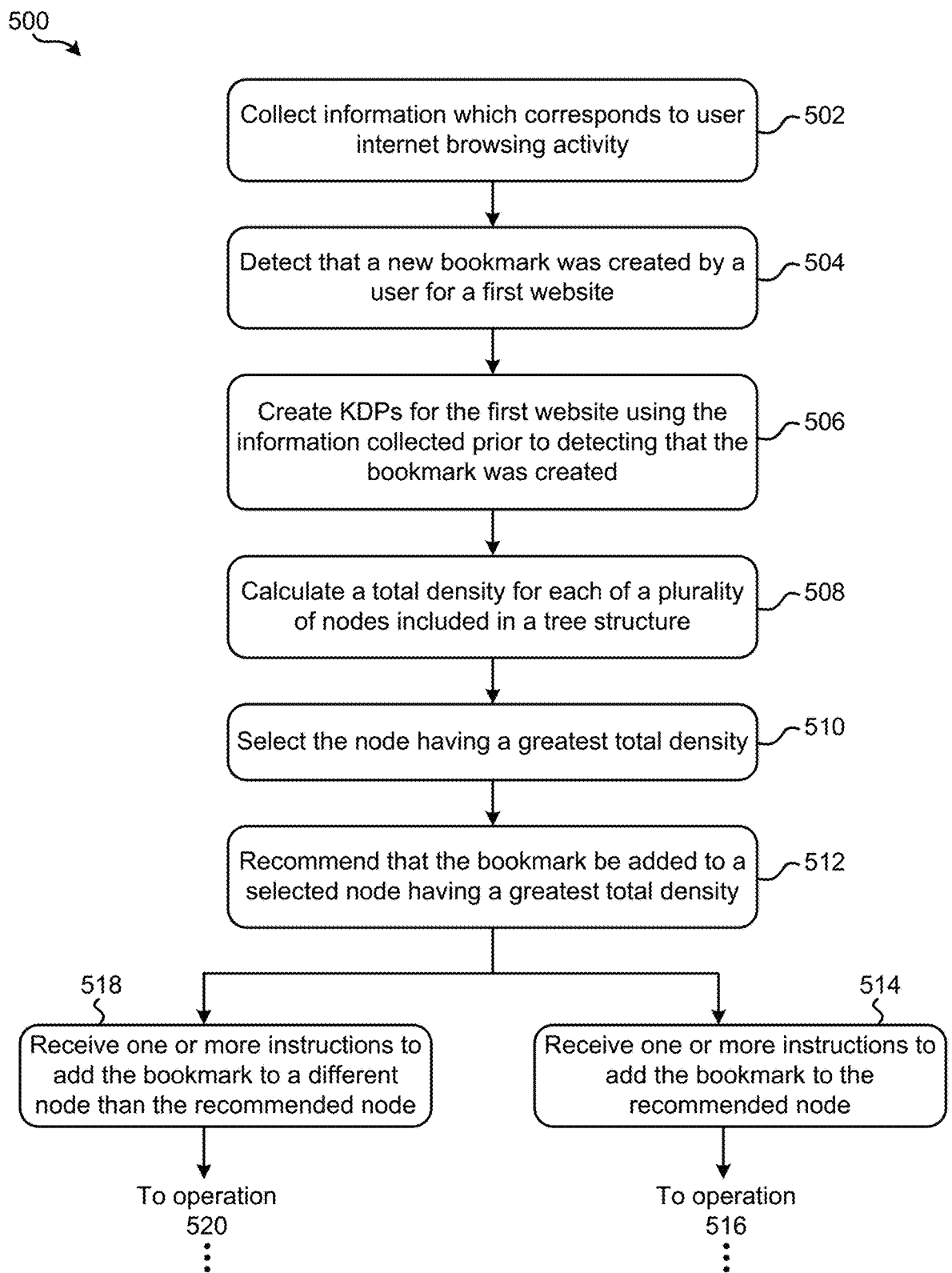
FIG. 5A is a flowchart of a method in accordance with one embodiment.
Figure 5A:
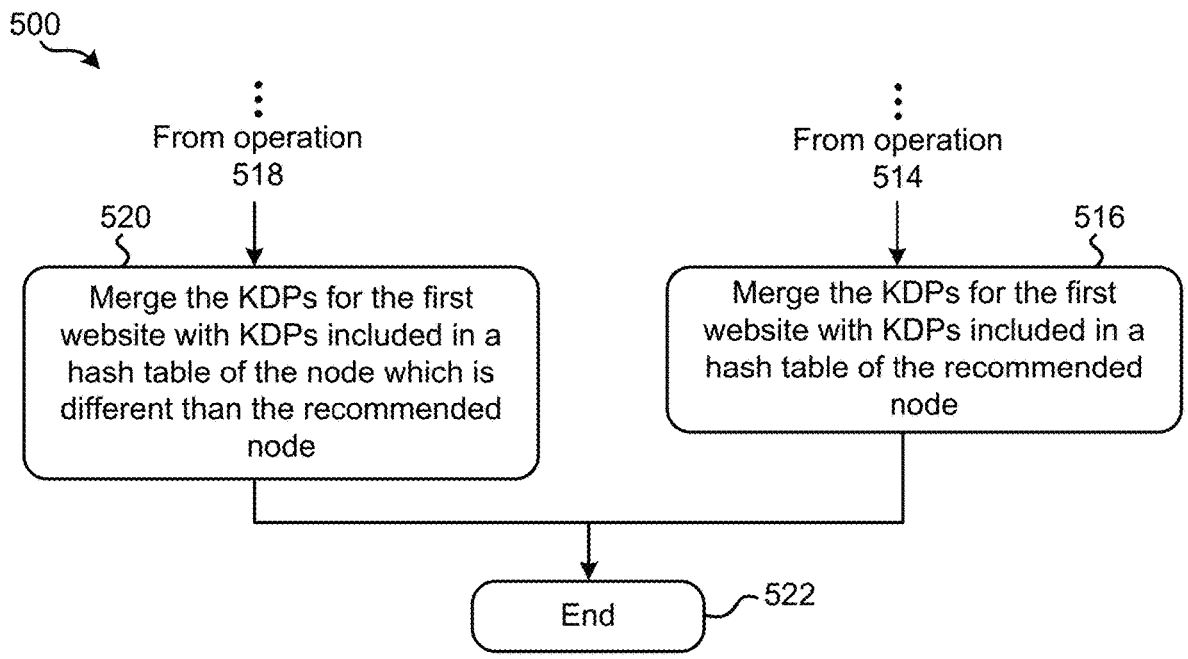

As shown in FIG. 5A, operation 502 of method 500 includes collecting information which corresponds to user internet browsing activity. However, it should be noted that "user" is in no way intended to limit the invention. Rather, internet browsing activity initiated by an application, administrator, server, etc. may be collected in operation 502 depending on the approach. The type of information collected in operation 502 also varies depending on the given approach. For instance, an illustrative list of types of information which may be collected in operation 502 includes, but is not limited to, URL content (e.g., internet addresses of websites visited), an amount of time spent accessing a given website, types of activity registered while accessing a given website (e.g., scrolling), hyperlink utilization, etc. It should also be noted that although operation 502 appears to be a single operation in FIG. 5A, it is preferred that the information is collected in a constant manner. In other words, information corresponding to user internet browsing activity is preferably collected continuously as long as the internet browsing activity persists.

As mentioned above, information corresponding to internet browsing activity may also be collected in a number of different ways. For instance, in some approaches, information which corresponds to user internet browsing activity is collected by accessing (e.g., querying) a server being used to facilitate the user's internet browsing activity. In other words, a server which maintains a user's connection to the internet and/or serves as an intermediary router between the two can send information (which corresponds to a user's internet browsing activity) to the controller performing various ones of the processes in method 500. In other approaches, the electronic device utilized by the user to facilitate internet access may store information which corresponds to the user's internet browsing activity. It follows that any one or more of the approaches described above in relation to operation 402 may be implemented in order to perform operation 502, e.g., as would be appreciated by one skilled in the art after reading the present description.

Referring still to FIG. 5A, method 500 also includes detecting that a new bookmark was created by a user for a first website. See operation 504. In some approaches the creation of the new bookmark is detected in response to receiving a notification that the bookmark was actually created by the user. In other approaches, the creation of the new bookmark may actually be detected as a result of receiving a request to actually create the new bookmark.

Operation 506 further includes creating KDPs for the first website using the information collected prior to detecting that the bookmark was created. In other words, the KDPs are created in operation 506 using the information which was actually collected in operation 502 prior to detecting that the bookmark was created, or at least a request to create the bookmark was received.

The process of actually creating the KDPs for the first website using the information collected prior to detecting that the bookmark was created may include any one or more of the approaches described above with respect to operation 408 of method 400. Accordingly, any of the sub-processes included in FIG. 4B may be implemented in order to perform operation 506. For instance, in some approaches creating the KDPs includes extracting a plurality of keywords from the first website, and calculating a density value for each of the plurality of extracted keywords based on the information collected prior to detecting that the bookmark was created.

Referring still to FIG. 5A, operation 508 includes calculating a total density for each of a plurality of nodes included in a tree structure. As alluded to above, calculating the total density for a given node is based on a number of keywords which overlap between the given node and the KDPs for the first website. Moreover, one of the entries in a hash map preferably serves as a placeholder which stores the total density of all keywords included in the hash map. For example, the last entry in the hash map is reserved for storing a total combined density of all KDP entries therein.

Figure 5B:
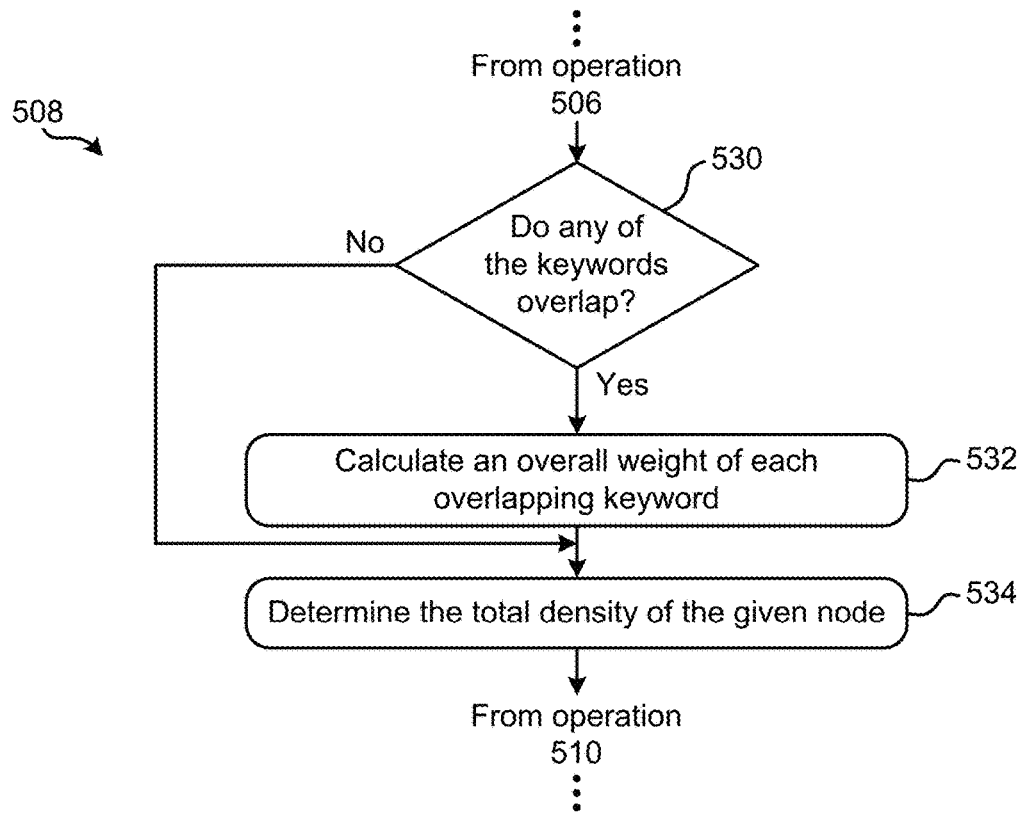
FIG. 5B is a flowchart of sub-processes for one of the operations in the method of FIG. 5A, in accordance with one embodiment.

Referring momentarily to FIG. 5B, exemplary sub-processes of calculating a total density for a given node included in a tree structure are illustrated in accordance with one embodiment, one or more of which may be used to perform operation 508 of FIG. 5A. However, it should be noted that the sub-processes of FIG. 5B are illustrated in accordance with one embodiment which is in no way intended to limit the invention.

As shown, decision 530 includes determining whether any of the keywords extracted from the first website overlap with (e.g., match) any of the keywords included in a hash list of the given node. In some approaches, each of the keywords extracted from the first website may be systematically compared to each of the keywords included in the hash list of the given node. Accordingly, the outcome of decision 530 may actually be determined as a result of a procedure which repeats in a recursive fashion for each of the keywords.

In response to determining none of the keywords extracted from the first website overlap with the keywords included in the hash list of the given node, the flowchart jumps directly to sub-operation 534, where the total density of the given node may be determined as being zero, e.g., as would be appreciated by one skilled in the art after reading the present description. However, in response to determining that at least one of the keywords extracted from the first website overlaps with at least one of the keywords included in the hash list of the given node, the flowchart proceeds to sub-operation 532. There, sub-operation 532 includes calculating an overall weight of each overlapping keyword. In some approaches, the density of each of the overlapping keywords is calculated in a same or similar way as described in the various approaches herein for calculating the density of a keyword (e.g., see sub-operation 452 of FIG. 4B). However, in some approaches the overall density value can be represented as a "weight", e.g., as previously mentioned. In such approaches, the weight of one or more keywords may be determined based on additional factors which include, but are not limited to, an amount of time a portion of the website which contains the keyword is displayed in a window visible to a user, a number of times the keyword is found on a subsequently and/or previously accessed website, search terms used to find the website, etc.

From sub-operation 532, the flowchart proceeds to sub-operation 534 which includes determining the total density of the given node. In preferred approaches, the total density of the given node is determined by adding (summing up) each calculated overall weight for the given node. However, the total density of the given node may be determined using any processes which would be apparent to one skilled in the art after reading the present description. However, calculating a total density for each of the plurality of nodes included in a tree structure is performed differently in other approaches. For instance, in some approaches the total density is determined using a breadth-first searching sequence, e.g., as will be described in further detail below.

Returning now to FIG. 5A, method 500 proceeds to operation 510 from operation 508. There, operation 510 includes selecting the node having a greatest total density, while operation 512 includes recommending that the bookmark be added to a selected node having a greatest total density. The recommendation is made in some approaches by actually sending a message to a user which initially created the bookmark. The message may be displayed on the screen of an electronic device being used by the user to conduct the internet browsing activity as a popup window, an email, a text message, etc. However, the recommendation may be made in any way which would be apparent to one skilled in the art after reading the present description.

Depending on the situation, the user may agree or disagree with the recommendation that is made. In some approaches the node recommended in operation 512 is actually used to store the bookmark. Accordingly, in some approaches method 500 proceeds to operation 514 which includes receiving one or more instructions to add the bookmark to the recommended node. In response to receiving the one or more instructions in operation 514, operation 516 includes merging the KDPs for the first website with KDPs included in a hash table of the recommended node.

However, in other approaches a node different than the one recommended in operation 512 is actually used to store the bookmark. As such, method 500 also proceeds from operation 512 to operation 518 which includes receiving one or more instructions to add the bookmark to a different node than the recommended node. Operation 520 additionally includes merging the KDPs for the first website with KDPs included in a hash table of the node which is different than the recommended node.

Figure 5C:
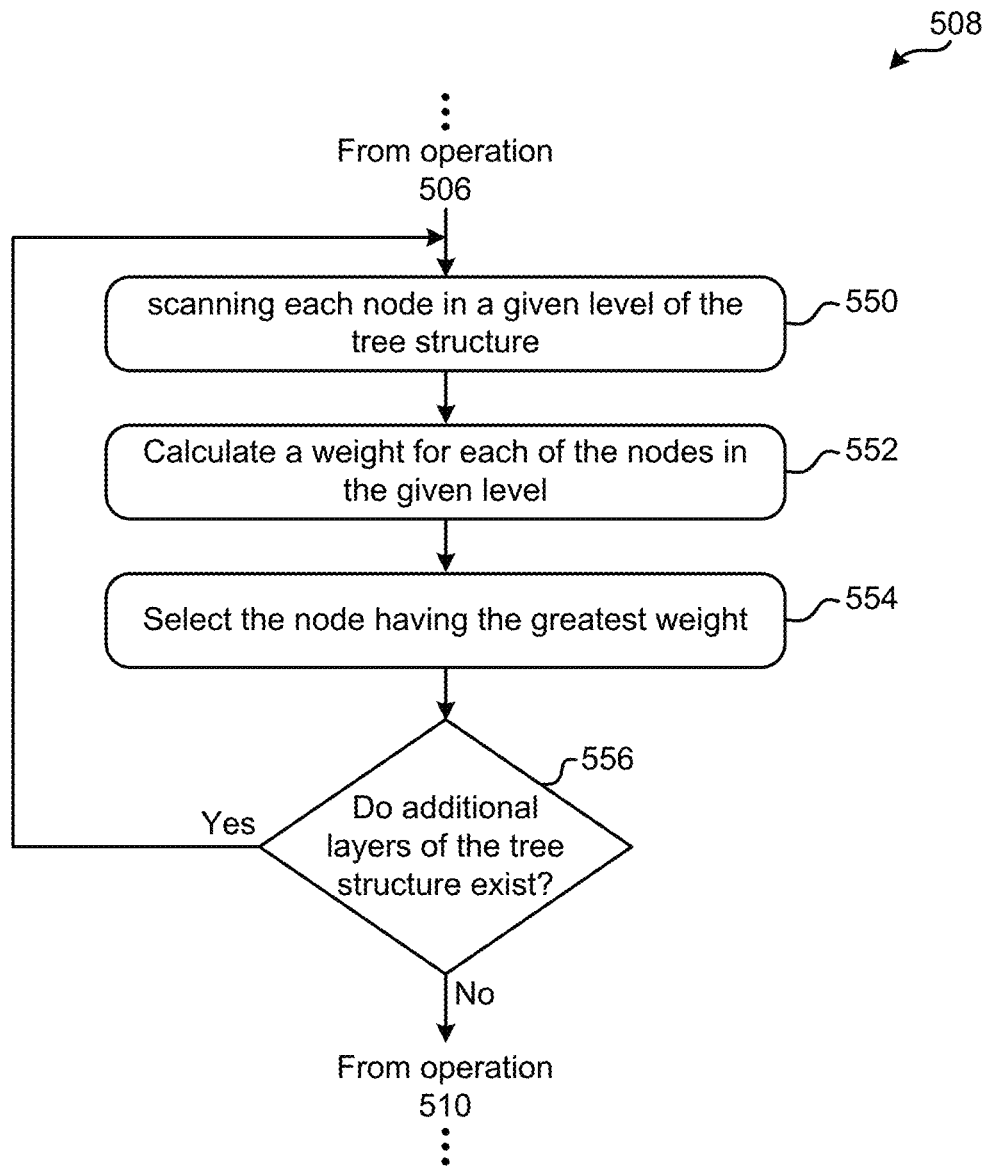
FIG. 5C is a flowchart of sub-processes for one of the operations in the method of FIG. 5A, in accordance with one embodiment.

Method 500 proceeds to operation 522 from operation 516 as well as operation 520, whereby method 500 may end. However, it should be noted that although method 500 may end upon reaching operation 522, any one or more of the processes included in method 500 may be repeated in order to create additional bookmarks for additional websites. In other words, any one or more of the processes included in method 500 may be repeated depending on the desired approach As mentioned above, calculating a total density for each of the plurality of nodes included in a tree structure is performed differently in various approaches. For instance, in some approaches the total density is determined using a breadth-first searching sequence. According to an exemplary in-use embodiment, which is in no way intended to limit the invention, FIG. 5C includes sub-processes of calculating a total density for each of a plurality of nodes included in a tree structure in accordance with one embodiment, one or more of which may be used to perform operation 508 of FIG. 5A. However, it should be noted that the sub-processes of FIG. 5C are illustrated in accordance with one embodiment which is in no way intended to limit the invention.

Sub-operation 550 includes scanning each node in the first level of the tree structure, while sub-operation 552 includes calculating a weight for each of the nodes in the first level. The breadth-first searching sequence is based on the different levels of the tree structure. Accordingly, the first level of the tree structure preferably corresponds to a highest or "top" level of the tree structure. Moreover, nodes which potentially include a greatest weight (e.g., density value) are tracked and compared against each other in the same level of the tree structure.

Looking to sub-operation 554, the node having the greatest weight is selected, and the nodes which extend from the selected node (also referred to herein as "sub-nodes") are subsequently scanned recursively in a similar fashion. Accordingly, decision 556 further determines whether an additional level of the tree structure exists below the current level. In response to determining that an additional layer of the tree structure does exist, the flowchart returns to sub-operation 550 such that each node in a next level of the tree structure are scanned. It follows that sub-processes 550, 552, 554 and 556 are performed in a recursive fashion until each of the nodes in a last layer of the tree structure have been evaluated. Moreover, the node determined as having the highest overall weight is preferably selected as a target folder for the newly created bookmark (e.g., see operation 510 of FIG. 5A above).

Figure 6:
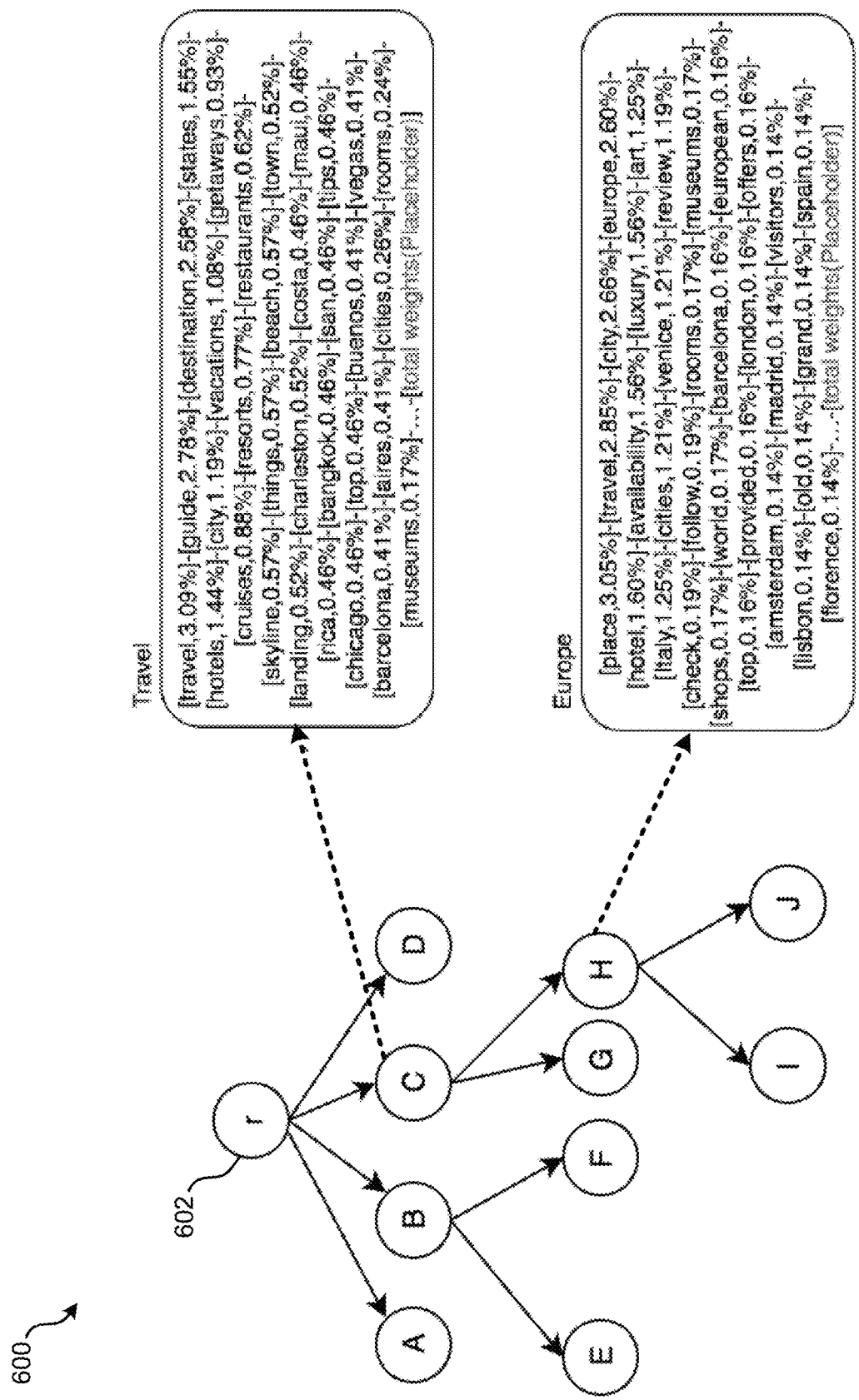
FIG. 6 is partial representational view of a tree structure in accordance with an exemplary embodiment.

As previously mentioned, each node in a tree structure as described herein preferably corresponds to a bookmark folder or subfolder, where at least some of the bookmark folders and/or subfolders include one or more bookmarks for websites included therein. Referring momentarily to FIG. 6, a tree structure 600 is illustrated in accordance with an in-use example, which is in no way intended to limit the invention. As shown, the tree structure includes a root 602 as well as a plurality of nodes which extend therefrom. As before, each of the nodes have been labeled A through J. Moreover, a detailed view of the hash map for node C and node H have been shown.

Looking first to the hash map of node C, it is apparent that the folder which node C represents relates to "travel". As such, each of the keywords included in the hash map of node C relate to travel. The hash map of node H further represents a sub-folder which is related to the subject (e.g., content) which node C represents. Accordingly, the hash map of node H is shown as relating to "Europe", and the keywords included therein also relate to Europe.

The list of keywords and their respective weights for each node are generated by contents under the given node in some approaches. For instance, the hash map node C is generated, at least in part, by combing the content included in each of the nodes G, H, I, J which extend therefrom. Similarly, the hash map of node H is generated, at least in part, by combining the content in nodes I and J.

The keywords in each of the hash maps are also ranked (e.g., organized) according to the respective density value. For instance, the keywords in the hash map is organized such that the density values progress in a descending order. Accordingly, keywords having the 201st and lower density values are not included in the hash map.

It follows that each node in the tree structure 600 is uniquely determined by its featured keywords and corresponding density values. Accordingly, recommendations may be made for the name of newly created nodes based on keywords created from previous steps. Moreover, sub-folders can share several keywords with the folder from which they extend, despite the fact that the density values thereof may differ depending on focus of each folder, thereby resulting in a unique ranking.

Moreover, the process of adding a new node to the tree structure varies depending on the approach. For instance, when user creates a new folder or sub-folder for bookmarks in a given tree structure, it is placed under an existing folder, sub-folder or the root itself. Moreover, any future bookmarks formed under this new folder or sub-folder will be analyzed and/or extracted such that a featured word list is generated for this new node.

According to an example, which is in no way intended to limit the invention, a new node K may be added to the tree structure 600 of FIG. 6, such that it is a sub-node of node D. Because the new node K represents a sub-folder which extends from the folder which node D represents, and the list of KDP pairs in D is determined by the various sub-nodes extending therefrom, after node K is added to the tree structure 600 and the hash map is generated for node K, the hash map of node D is preferably updated. This ensures that keywords for each of the nodes are updated and responsive to any change in the tree structure 600. For instance, deletions, additions, updates, etc. performed on the various folders and/or subfolders as well as the bookmarks included therein preferably initiate an update of the keywords and corresponding density values accordingly.

It follows that in some approaches, the process of adding a new bookmark involves performing a number of operations which identify the target folder in which the new bookmark may be added. According to an example, which is in no way intended to limit the invention, these processes include detecting KDPs from the new bookmark based on site link, title, body, etc. Moreover, a Breadth-First Search is conducted on the tree structure to scan each level of the tree. Keywords gleaned from the new bookmark are also compared with a featured word list as well as the corresponding density values to identify matching words. Matching words are further used to calculate the total density value of each node in the tree structure, e.g., using Equation 3 below:

$$\text{Total weight} = \{density[1]*weight[1] + density[2]*weight[2] + \ldots + density[N]*weight[N]\}*100 \quad \text{Equation 3}$$

where density[i], weight[i] are density and weight from matching word i, respectively. Furthermore, the total weights are stored as the last entry of list in the respective node, and each node is compared level-by-level until a target folder having a maximum total weight is identified.

Figure 7A:
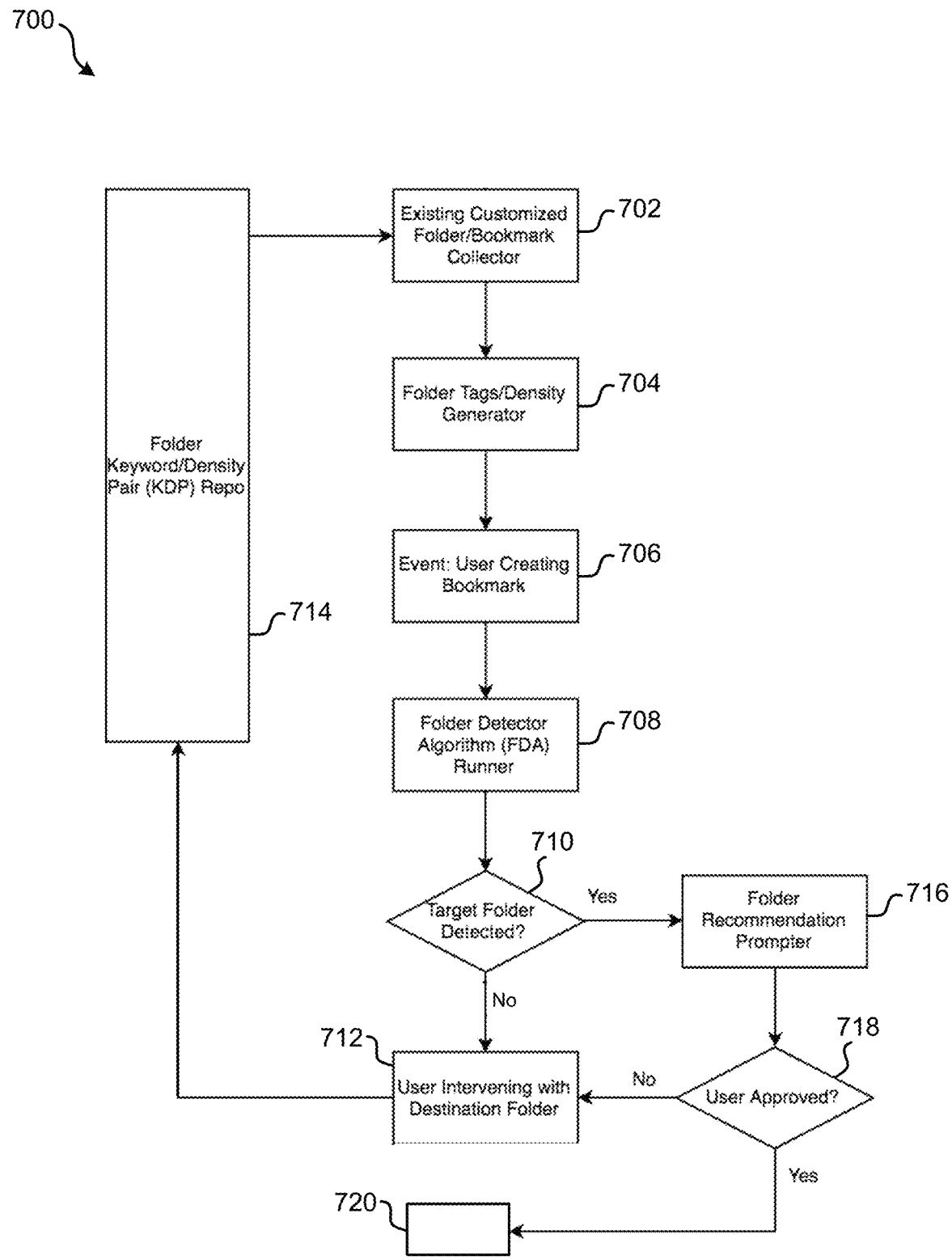
FIG. 7A is the flowchart of a method in accordance with an exemplary embodiment.

Looking now to FIG. 7A, the flowchart of a method 700 according to an in-use example is illustrated. As shown, operation 702 includes using existing customized folder and/or bookmark collectors to collect what folders and/or bookmarks already exist in a user's browser. According to some approaches, this may be performed by accessing cookies or other data and/or metadata stored on the user's electronic device used to access the internet.

Moreover, operation 704 includes calculating KDPs for each of the existing folders identified in operation 702. This may be performed using any of the approaches included herein. In the event that the user creates a new bookmark, an indication is sent in some approaches. Accordingly, operation 706 includes identifying that a new bookmark has been created. Furthermore, operation 708 includes using a folder detector algorithm (FDA) to identify a target folder or sub-folder for the newly created bookmark. It follows that the FDA may include performing any one or more of the processes included in the various embodiments described herein. Referring momentarily to FIG. 7B, pseudocode 750 for the FDA is illustrated in accordance with an in-use example, which is in no way intended to limit the invention. Accordingly, the pseudocode depicted in FIG. 7B is implemented in some approaches to perform operation 708 in FIG. 7A.

Decision 710 includes determining whether the target folder or sub-folder identified in operation 708 is detected. In some situations, two folders and/or sub-folders may produce a similar result upon performing the FDA. In such situations, user input may be desired in order to select one of the similar results. In response to determining that the target folder or sub-folder is not detected, method 700 proceeds to operation 712 where user intervention is used to determine the destination folder or sub-folder for the newly created bookmark. From operation 712, method 700 proceeds to operation 714 where a KDP repository is updated with the newly acquired information relating to the folder or sub-folder which the new bookmark has been added. This update to the KDP repository is performed by a KDP repository updater module in some approaches. By updating the KDP repository, cognitive learning and pattern training is effectively used to develop accurate KDPs and achieve individually customized patterns for created bookmarks.

Returning to decision 710, method 700 proceeds to operation 716 in response to determining that the target folder or sub-folder is detected. There, operation 716 includes recommending the target folder or sub-folder to the user. As mentioned above, this is achieved in some approaches by displaying a popup window to the user which lists the target folder or sub-folder as a suggested destination for the newly created bookmark. However, any other approaches included herein may be implemented to make the recommendation.

Decision 718 further includes determining whether the user decided to follow the recommendation provided in operation 716. In response to determining that the user did not follow the recommendation, the flowchart proceeds to operation 712 where the user intervention is used to determine the destination folder or sub-folder for the newly created bookmark. From operation 712 method 700 proceeds to operation 714, eventually returning to operation 702 such that various ones of the processes included in FIG. 7A may be repeated. However, in response to determining that the user did follow the recommendation, the flowchart proceeds to operation 720 whereby method 700 may end.

Using a hash map to store the KDPs for the various bookmarks as described herein is desirable as searches performed on the hash map are completed in a constant amount of time. A hash map also occupies an amount of space (memory) which correlates to the number of keywords detected in the given bookmarked site. Moreover, the amount of time it takes to search a tree structure using a breadth-first search as described herein only depends on the number of bookmark folders (nodes) and sub-folders (sub-nodes) which are included in the tree structure. The amount of space (memory) the tree structure occupies also depends on the number of folders and sub-folders in a similar way. Further still, the amount of time involved with storing keywords and corresponding density values in each folder of the tree structure is performed using a linked list in some approaches, e.g., as would be appreciated by one skilled in the art after reading the present description. Accordingly, the amount of time and space (memory) involved depends on the number of keywords that are stored in each respective folder.

As a result, the time complexity involved with identifying a target folder or sub-folder for a newly created bookmark only depends on the number of bookmark folders and sub-folders multiplied by the number of keywords that are stored in each respective folder. Similarly, the space complexity involved with various ones of the approaches included herein depends on the number of bookmark folders and sub-folders multiplied by the number of keywords that are stored in each respective folder, and added to the number of keywords detected in the website which corresponds to the newly created bookmark.

It follows that various ones of the embodiments included herein are able to automatically categorize bookmarks from customized folders and implement recommendations based on user browsing behavior. This is achieved in some approaches by tracking the correlation websites which are potentially in the same category even before a bookmark is created. For example, some of the approaches included herein track the websites that a user reviewed in the last 15 minutes before a bookmark is created, as well as the amount of time the user spends accessing each of these sites. A density value may thereby be assigned for keywords extracted from these sites, thereby exploring the potential correlations therebetween to determine the category of targeted bookmarks, and also extend the dataset source to improve accuracy. Some of the approaches described herein also provide pattern training mechanism to adjust KDP datasets based on user feedback. This further enhances the accuracy of categorization result.

Moreover, these improvements may be achieved with minimal cost as additional equipment and/or infrastructure is not used in many cases. Accordingly, various ones of the embodiments included herein may be implemented in a cloud-based computing environment. Accordingly, one skilled in the art will appreciated after reading the present description that any one or more of the approaches included herein can be implemented in a cloud computing environment. Furthermore, the various approaches herein are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
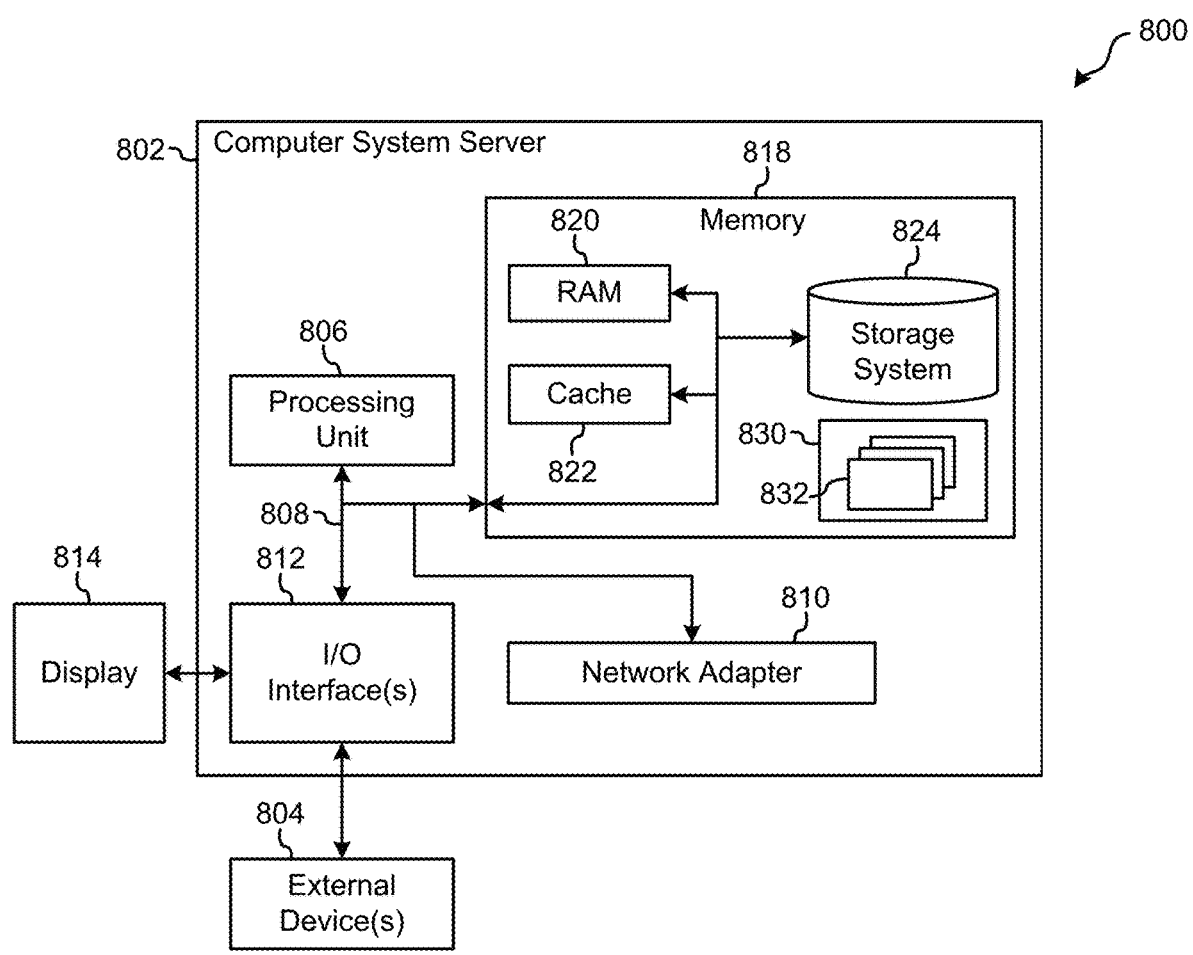
FIG. 8 depicts a cloud computing node according to an embodiment of the present invention.

Referring now to FIG. 8, a schematic of an example of a cloud computing node is shown. Cloud computing node 800 is only one example of a suitable cloud computing node and is not intended to suggest any limitation as to the scope of use or functionality of embodiments of the invention described herein. Regardless, cloud computing node 800 is capable of being implemented and/or performing any of the functionality set forth hereinabove.

In cloud computing node 800 there is a computer system/server 802, which is operational with numerous other general purpose or special purpose computing system environments or configurations. Examples of well-known computing systems, environments, and/or configurations that may be suitable for use with computer system/server 802 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 802 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 802 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 802 in cloud computing node 800 is shown in the form of a general-purpose computing device. The components of computer system/server 802 may include, but are not limited to, one or more processors or processing units 806, a system memory 818, and a bus 808 that couples various system components including system memory 818 to processor 806.

Bus 808 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 802 typically includes a variety of computer system readable media. Such media may be any available media that is accessible by computer system/server 802, and it includes both volatile and non-volatile media, removable and non-removable media.

System memory 818 can include computer system readable media in the form of volatile memory, such as random access memory (RAM) 820 and/or cache memory 822. Computer system/server 802 may further include other removable/non-removable, volatile/non-volatile computer system storage media. By way of example only, storage system 824 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 808 by one or more data media interfaces. As will be further depicted and described below, memory 818 may include at least one program product having a set (e.g., at least one) of program modules that are configured to carry out the functions of embodiments of the invention.

Program/utility 830, having a set (at least one) of program modules 832, may be stored in memory 818 by way of example, and not limitation, as well as an operating system, one or more application programs, other program modules, and program data. Each of the operating system, one or more application programs, other program modules, and program data or some combination thereof, may include an implementation of a networking environment. Program modules 832 generally carry out the functions and/or methodologies of embodiments of the invention as described herein.

Computer system/server 802 may also communicate with one or more external devices 804 such as a keyboard, a pointing device, a display 814, etc.; one or more devices that enable a user to interact with computer system/server 802; and/or any devices (e.g., network card, modem, etc.) that enable computer system/server 802 to communicate with one or more other computing devices. Such communication can occur via Input/Output (I/O) interfaces 812. Still yet, computer system/server 802 can communicate with one or more networks such as a local area network (LAN), a general wide area network (WAN), and/or a public network (e.g., the Internet) via network adapter 810. As depicted, network adapter 810 communicates with the other components of computer system/server 802 via bus 808. It should be understood that although not shown, other hardware and/or software components could be used in conjunction with computer system/server 802. Examples, include, but are not limited to: microcode, device drivers, redundant processing units, external disk drive arrays, RAID systems, tape drives, and data archival storage systems, etc.

Figure 9:
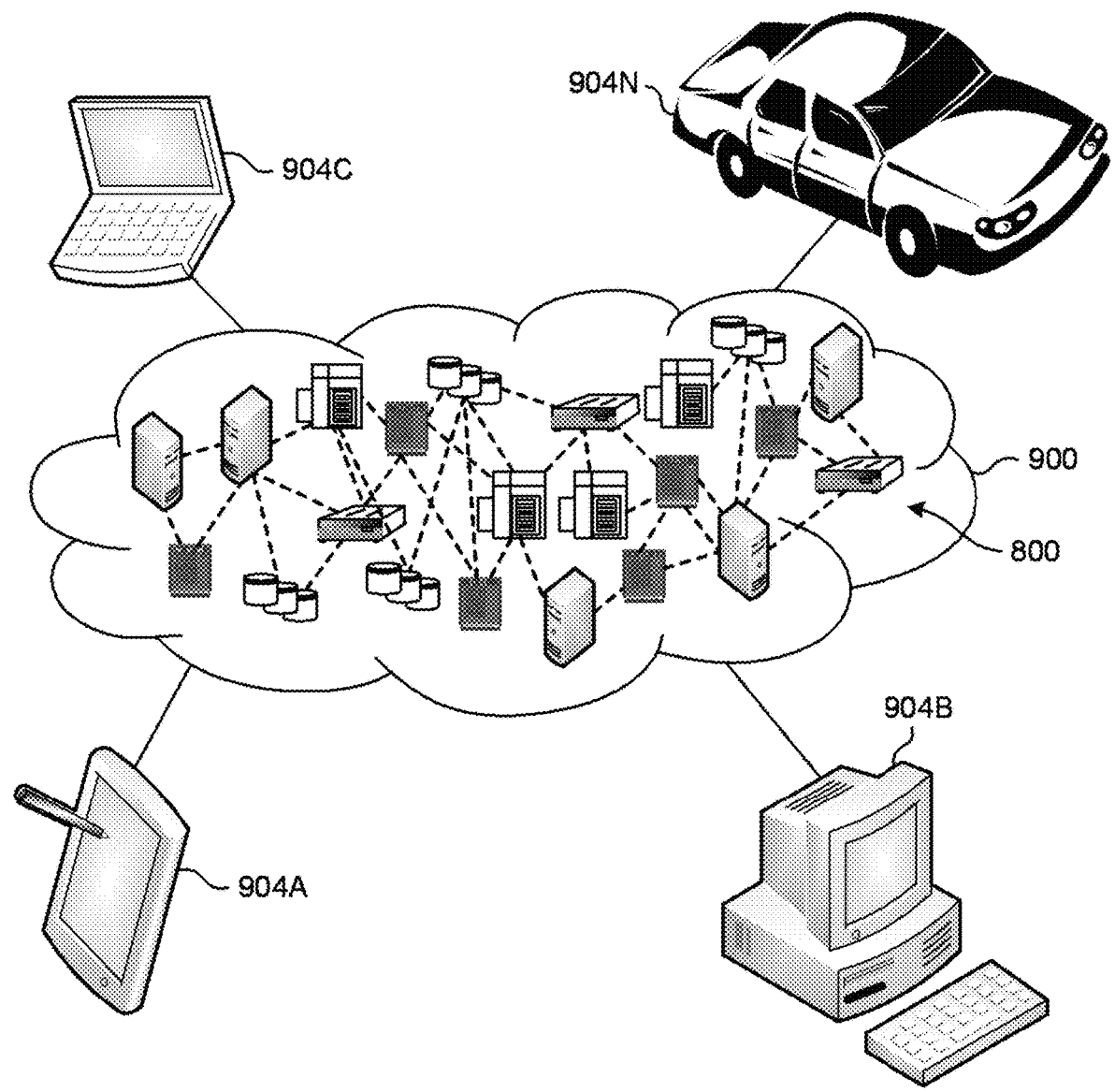
FIG. 9 depicts a cloud computing environment according to an embodiment of the present invention.

Referring now to FIG. 9, illustrative cloud computing environment 900 is depicted. As shown, cloud computing environment 900 includes one or more cloud computing nodes 800 with which local computing devices used by cloud consumers, such as, for example, personal digital assistant (PDA) or cellular telephone 904A, desktop computer 904B, laptop computer 904C, and/or automobile computer system 904N may communicate. Nodes 800 may communicate with one another. They may be grouped (not shown) physically or virtually, in one or more networks, such as Private, Community, Public, or Hybrid clouds as described hereinabove, or a combination thereof. This allows cloud computing environment 900 to offer infrastructure, platforms and/or software as services for which a cloud consumer does not need to maintain resources on a local computing device. It is understood that the types of computing devices 904A-N shown in FIG. 9 are intended to be illustrative only and that computing nodes 800 and cloud computing environment 900 can communicate with any type of computerized device over any type of network and/or network addressable connection (e.g., using a web browser).

Figure 10:
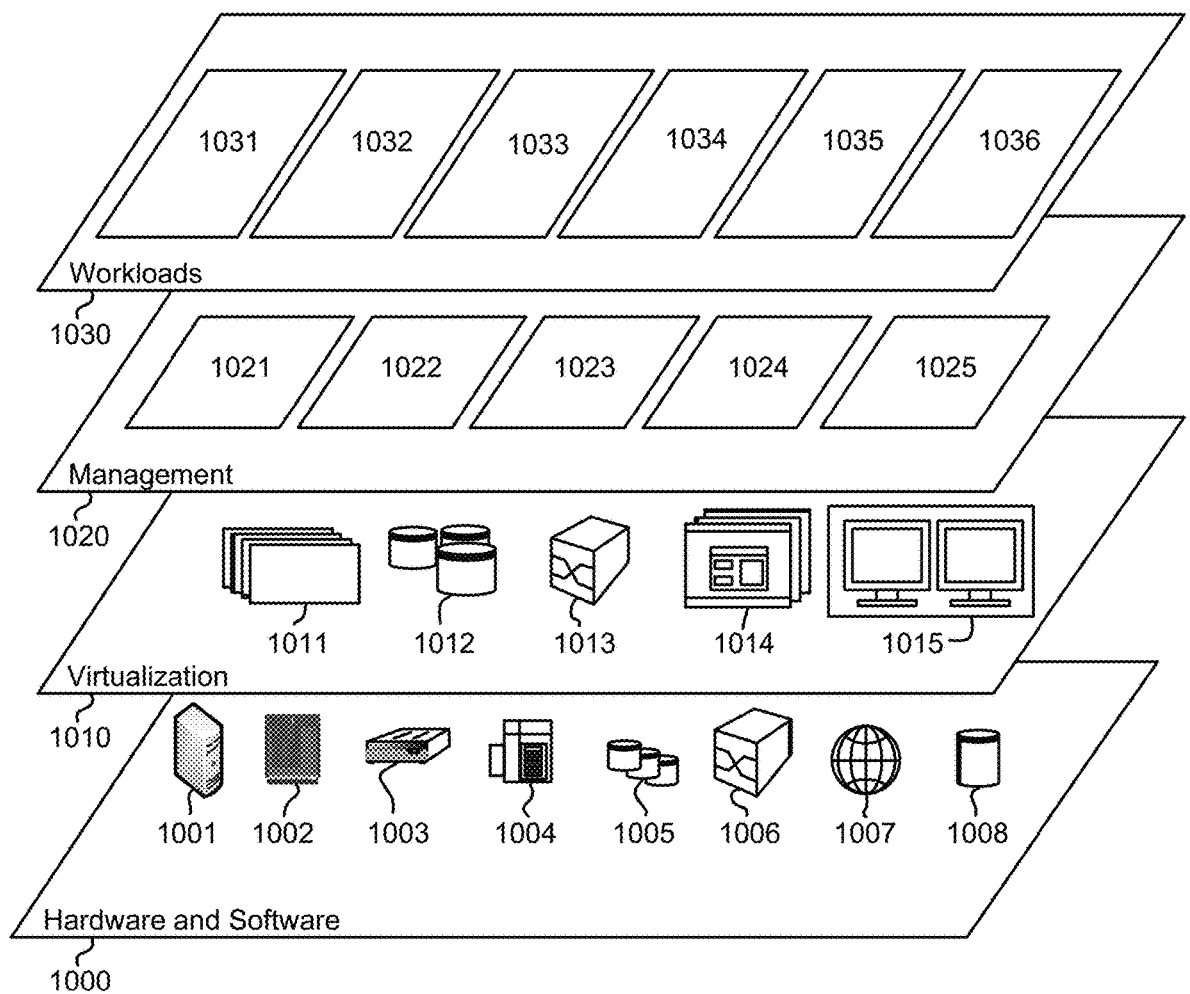
FIG. 10 depicts abstraction model layers according to an embodiment of the present invention.

Referring now to FIG. 10, a set of functional abstraction layers provided by cloud computing environment 900 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 1000 includes hardware and software components. Examples of hardware components include: mainframes 1001; RISC (Reduced Instruction Set Computer) architecture based servers 1002; servers 1003; blade servers 1004; storage devices 1005; and networks and networking components 1006. In some embodiments, software components include network application server software 1007 and database software 1008.

Virtualization layer 1010 provides an abstraction layer from which the following examples of virtual entities may be provided: virtual servers 1011; virtual storage 1012; virtual networks 1013, including virtual private networks; virtual applications and operating systems 1014; and virtual clients 1015.

In one example, management layer 1020 may provide the functions described below. Resource provisioning 1021 provides dynamic procurement of computing resources and other resources that are utilized to perform tasks within the cloud computing environment. Metering and Pricing 1022 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 1023 provides access to the cloud computing environment for consumers and system administrators. Service level management 1024 provides cloud computing resource allocation and management such that required service levels are met. Service Level Agreement (SLA) planning and fulfillment 1025 provide pre-arrangement for, and procurement of, cloud computing resources for which a future requirement is anticipated in accordance with an SLA.

Workloads layer 1030 provides examples of functionality for which the cloud computing environment may be utilized. Examples of workloads and functions which may be provided from this layer include: mapping and navigation 1031; software development and lifecycle management 1032; virtual classroom education delivery 1033; data analytics processing 1034; transaction processing 1035; and automatically categorizing bookmarks based on web browsing activity 1036.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
    collecting information which corresponds to internet browsing activity;
    receiving a request to create a bookmark for a first website; and creating keyword and density pairs (KDPs) for the first website using the information collected prior to receiving the request to create the bookmark,
wherein creating the KDPs includes:
  extracting a plurality of keywords from the first website,
  calculating a density value for each of the plurality of keywords based on the information collected prior to receiving the request to create the bookmark, wherein calculating a density value for a given keyword based on the information collected prior to receiving the request to create the bookmark includes:
    increasing the density value of the given keyword by an amount which corresponds to an amount of time spent accessing other websites determined as including the given keyword, and
  adding each keyword and respective density value to a hash map as a KDP entry.

2. The computer-implemented method of claim 1, wherein one of the entries in the hash map serves as a placeholder which stores a total density of all keywords included in the hash map.

3. The computer-implemented method of claim 1, wherein the hash map corresponds to a node of a tree structure, wherein the tree structure includes a plurality of nodes, wherein each of the plurality of nodes corresponds to a bookmark folder or sub-folder.

4. The computer-implemented method of claim 3, wherein each of the remaining plurality of nodes includes a respective hash map, wherein each entry in the hash map of a given node is based on the hash maps of any nodes which are subsets of the given node.

5. The computer-implemented method of claim 1, wherein calculating a density value for a given keyword based on the information collected prior to receiving the request to create the bookmark includes:
  determining whether the given keyword is included in any other websites accessed by the internet browsing activity within a window of time which precedes a time that the request to create the bookmark was received.

6. The computer-implemented method of claim 1, comprising:
  detecting that a hyperlink accessible on the first website was used to access a second website;
  extracting a plurality of keywords from the second website;
  determining whether any of the keywords extracted from the second website overlap with any of the keywords extracted from the first website; and
  calculating an overall density of each overlapping keyword in response to determining that at least one of the keywords extracted from the second website overlaps with at least one of the keywords extracted from the first website, respectively.

7. A computer-implemented method, comprising:
  collecting information which corresponds to internet browsing activity;
  detecting that a bookmark was created for a first website;
  creating keyword and density pairs (KDPs) for the first website using the information collected prior to detecting that the bookmark was created, wherein creating the KDPs includes:
    extracting a plurality of keywords from the first website, and
    calculating a density value for each of the plurality of keywords based on the information collected prior to detecting that the bookmark was created;
  calculating a total density for each of a plurality of nodes included in a tree structure, wherein calculating the total density for a given node is based on a number of keywords which overlap between the given node and the KDPs for the first website; and
  recommending that the bookmark be added to a node having a greatest total density.

8. The computer-implemented method of claim 7, wherein calculating the total density for a given node includes:
  determining whether any of the keywords extracted from the first website overlap with any of the keywords included in a hash list of the given node;
  calculating an overall density of each overlapping keyword in response to determining that at least one of the keywords extracted from the first website overlaps with at least one of the keywords included in the hash list of the given node; and
  determining the total density of the given node by adding each calculated overall density.

9. The computer-implemented method of claim 7, wherein calculating a total density for each of the plurality of nodes included in the tree structure is performed using a breadth-first searching sequence.

10. The computer-implemented method of claim 7, wherein each node in the tree structure corresponds to a bookmark folder, wherein at least some of the bookmark folders include one or more bookmarks for websites included therein.

11. The computer-implemented method of claim 7, wherein the operations are performed by a controller included in a computer which is connected to the Internet.

12. The computer-implemented method of claim 7, comprising:
  receiving one or more instructions to add the bookmark to the recommended node; and
  merging the KDPs for the first website with KDPs included in a hash table of the recommended node.

13. The computer-implemented method of claim 7, comprising:
  receiving one or more instructions to add the bookmark to a different node than the recommended node; and
  merging the KDPs for the first website with KDPs included in a hash table of the different node.

14. A computer program product comprising a computer readable storage medium having program instructions embodied therewith, the program instructions readable and/or executable by a processor to cause the processor to perform a method comprising:
  collecting, by the processor, information which corresponds to internet browsing activity;
  detecting, by the processor, that a bookmark was created for a first website;
  creating, by the processor, keyword and density pairs (KDPs) for the first website using the information collected prior to detecting that the bookmark was created,
    wherein creating the KDPs includes:
    extracting a plurality of keywords from the first website, and
    calculating a density value for each of the plurality of keywords based on the information collected prior to detecting that the bookmark was created;

calculating, by the processor, a total density for each of a plurality of nodes included in a tree structure, wherein calculating the total density for a given node is based on a number of keywords which overlap between the given node and the KDPs for the first website; and recommending, by the processor, that the bookmark be added to a node having a greatest total density.

15. The computer program product of claim 14, wherein calculating the total density for a given node includes:

determining whether any of the keywords extracted from the first website overlap with any of the keywords included in a hash list of the given node;

calculating an overall density of each overlapping keyword in response to determining that at least one of the keywords extracted from the first website overlaps with at least one of the keywords included in the hash list of the given node; and determining the total density of the given node by adding each calculated overall density.

16. The computer program product of claim 14, wherein calculating a total density for each of the plurality of nodes included in the tree structure is performed using a breadth-first searching sequence.

17. The computer program product of claim 14, wherein each node in the tree structure corresponds to a bookmark folder, wherein at least some of the bookmark folders include one or more bookmarks for websites included therein.

18. The computer program product of claim 14, wherein the processor is included in a computer which is connected to the Internet.

19. The computer program product of claim 14, the program instructions readable and/or executable by the processor to cause the processor to perform the method comprising:

receiving, by the processor, one or more instructions to add the bookmark to the recommended node; and merging, by the processor, the KDPs for the first website with KDPs included in a hash table of the recommended node.

20. The computer program product of claim 14, the program instructions readable and/or executable by the processor to cause the processor to perform the method comprising:

receiving, by the processor, one or more instructions to add the bookmark to a different node than the recommended node; and merging, by the processor, the KDPs for the first website with KDPs included in a hash table of the different node.

* * * * *